(12) United States Patent
Wietgrefe

(10) Patent No.: US 8,387,824 B2
(45) Date of Patent: Mar. 5, 2013

(54) APPARATUSES AND METHODS FOR BULK DISPENSING

(75) Inventor: Gary W. Wietgrefe, Sioux Falls, SD (US)

(73) Assignee: Syngenta Participations AG, Basel (CH)

( * ) Notice: Subject to any disclaimer, the term of this patent is extended or adjusted under 35 U.S.C. 154(b) by 622 days.

(21) Appl. No.: 12/605,061

(22) Filed: Oct. 23, 2009

(65) Prior Publication Data

US 2010/0108711 A1    May 6, 2010

Related U.S. Application Data

(63) Continuation-in-part of application No. 11/332,963, filed on Jan. 17, 2006, now Pat. No. 7,640,075.

(60) Provisional application No. 60/696,086, filed on Jul. 2, 2005.

(51) Int. Cl.
*B65B 1/04* (2006.01)

(52) U.S. Cl. ......... 222/1; 222/195; 222/243; 222/408.5; 222/559; 222/561; 222/151

(58) Field of Classification Search ................. 222/195, 222/243, 244, 408.5, 1, 559, 561, 148, 149, 222/151, 630, 636, 637; 406/85–92, 134, 406/136–138; 366/101, 106, 107
See application file for complete search history.

(56) References Cited

U.S. PATENT DOCUMENTS

| 1,341,174 | A | * | 5/1920 | Ingram et al. | ................. | 222/243 |
| 2,128,488 | A | * | 8/1938 | Koerner | ........................ | 141/360 |
| 2,512,451 | A | * | 6/1950 | Withall | ....................... | 105/282.3 |
| 3,147,892 | A | * | 9/1964 | McCullough | ................. | 222/195 |
| 3,645,583 | A | | 2/1972 | Heath | | |
| 3,713,564 | A | | 1/1973 | Cottrell | | |
| 3,829,022 | A | | 8/1974 | Reiter | | |
| 3,942,689 | A | | 3/1976 | Dakin, Jr. et al. | | |
| 4,059,311 | A | | 11/1977 | Spitzer et al. | | |
| 4,172,539 | A | | 10/1979 | Botkin | | |
| 4,176,767 | A | | 12/1979 | Franche | | |
| 4,189,262 | A | | 2/1980 | Anderson | | |
| 4,662,543 | A | | 5/1987 | Solimar | | |
| 4,856,681 | A | | 8/1989 | Murray | | |
| 4,874,281 | A | | 10/1989 | Bergerioux et al. | | |

(Continued)

FOREIGN PATENT DOCUMENTS

| DE | 2942308 | 5/1981 |
| DE | 3716047 | 12/1988 |

(Continued)

OTHER PUBLICATIONS

AG Partners LLC. Bulkseed.com [online]. [retrieved on Jun. 27, 2005]. Retrieved from the Internet: http://agpartners.com/bulkseed/seed_retailers.htm.

(Continued)

*Primary Examiner* — J. Casimer Jacyna
(74) *Attorney, Agent, or Firm* — Jenkins, Wilson, Taylor & Hunt, P.A.

(57) ABSTRACT

Apparatuses and methods relating to hoppers and the dispensing of bulk therefrom are provided. The hopper can include hopper walls that form a product storage receptacle. The hopper can also include a hopper door that includes a frame and a slide gate disposed within the frame. The slide gate is retractable between an open position and a closed position. A set of fingers projects from the slide gate to dislodge material proximate to the hopper door. Further, a port can be provided through at least one of the fingers of the set of fingers with the port configured to inject a fluid into the hopper.

5 Claims, 16 Drawing Sheets

U.S. PATENT DOCUMENTS

| | | | |
|---|---|---|---|
| 4,934,569 | A | 6/1990 | Womack, Jr. et al. |
| 5,139,175 | A | 8/1992 | Krysel et al. |
| 5,457,627 | A | 10/1995 | Cureton et al. |
| 5,467,892 | A | 11/1995 | Schlamp |
| 5,697,535 | A | 12/1997 | Coleman |
| 5,829,616 | A | 11/1998 | Daniel et al. |
| 5,878,402 | A | 3/1999 | Brewster et al. |
| 6,188,936 | B1 | 2/2001 | Maguire et al. |
| 6,264,104 | B1 | 7/2001 | Jenkins et al. |
| 6,560,700 | B1 | 5/2003 | Birkler et al. |
| 6,688,435 | B1 | 2/2004 | Will et al. |
| 6,766,218 | B2 | 7/2004 | Rosenblum |
| 6,774,318 | B2 | 8/2004 | Beal et al. |
| 6,848,867 | B2 | 2/2005 | Kroemmer et al. |
| 6,860,700 | B2 | 3/2005 | Powell et al. |
| 6,971,541 | B2 | 12/2005 | Williams et al. |
| 6,987,452 | B2 | 1/2006 | Yang |
| D549,755 | S | 8/2007 | Wietgrefe et al. |
| 7,263,411 | B2 | 8/2007 | Shows et al. |
| 7,640,075 | B2 | 12/2009 | Wietgrefe |
| 2001/0011437 | A1 | 8/2001 | Shortridge et al. |
| 2004/0004085 | A1 | 1/2004 | Williams et al. |
| 2005/0004682 | A1 | 1/2005 | Gaddis et al. |
| 2005/0092389 | A1 | 5/2005 | Mazur et al. |
| 2007/0005186 | A1 | 1/2007 | Wietgrefe |
| 2010/0017021 | A1 | 1/2010 | Wietgrefe |

FOREIGN PATENT DOCUMENTS

| | | |
|---|---|---|
| EP | 348008 | 12/1989 |
| EP | 1362802 | 11/2003 |
| GB | 831277 | 3/1960 |
| JP | 2120393 U1 | 9/1990 |
| JP | 2001-180789 | 7/2001 |
| WO | WO 02/21402 | 3/2002 |
| WO | WO2007/005054 | 1/2007 |

OTHER PUBLICATIONS

Buckhorn—Center Flow Container Seed Box [online]. Buckhorn, Inc. [retrieved on Jun. 27, 2005]. Retrieved from the Internet: http://www.buckhominic.com/products/cbb/cbb_11.html.

"Design for popular PROBOX™ bulk seed handling system available to seed industry. Pioneer system offers growers improved efficiency and convenience." Des Moines, Iowa, Mar. 11, 1999, SeedQuest [online]. [retrieved on Jun. 27, 2005]. Retrieved from the Internet: http://seedquest.com/News/releases/usa/Pioneer/N1618.htm.

Friesenusa.com—Bulk Seed Handling [online]. Friesen USA, Inc. [retrieved on Jun. 27, 2005]. Retrieved from the Internet: http://friesenusa.com/bulk.seed.handling.htm.

Notice of Allowance corresponding to U.S. Appl. No. 11/332,963 dated Sep. 3, 2009.
Official Communication corresponding to U.S. Appl. No. 11/332,963 dated Aug. 21, 2008.
Official Communication corresponding to U.S. Appl. No. 11/332,963 dated Mar. 6, 2009.
Pulsonic Bin Activator system at http://www.pulsonics.com/products_more.asp [accessed Aug. 11, 2009].
SHAPA Technical Bulletin No. 12, "Discharge Aids," Aug. 2007.
Advisory Action corresponding to U.S. Appl. No. 11/332,963 dated Jul. 29, 2009.
Bin-Butler Aeration System at http://www.workmaster.net/pdfs/bin-butler.pdf; copyright date of 2007 was found on the website where the brochure can be found.
Buckhorn, Inc., Center Flow Container [brochure]; a copyright date of 2005 is found on the brochure.
Buckhorn, Inc., Center Flow Seedbox™ [brochure]; a copyright date of 2001 is found on the brochure.
International Preliminary Report on Patentability corresponding to International Patent Application No. PCT/US2006/001584 dated Jan. 9, 2008.
Interview Summary corresponding to U.S. Appl. No. 12/567,017 dated Dec. 13, 2011.
Notification of Transmittal of the International Search Report and the Written Opinion of the International Searching Authority, or the Declaration corresponding to International Patent Application No. PCT/US2006/001584 dated Jul. 27, 2007.
Official Action corresponding to Canadian Patent Application No. 2,613,637 dated Jul. 6, 2010.
Official Action corresponding to Canadian Patent Application No. 2,613,637 dated Feb. 3, 2011.
Official Action corresponding to Canadian Patent Application No. 2,613,637 dated Feb. 7, 2012.
Official Action corresponding to Canadian Patent Application No. 2,727,764 dated Apr. 8, 2011.
Official Action corresponding to Canadian Patent Application No. 2,727,764 dated Dec. 6, 2011.
Official Action corresponding to U.S. Appl. No. 11/332,963 dated Apr. 8, 2008.
Official Action corresponding to U.S. Appl. No. 12/567,017 dated Oct. 7, 2010.
Official Action corresponding to U.S. Appl. No. 12/567,017 dated Jan. 7, 2011.
Official Action corresponding to U.S. Appl. No. 12/567,017 dated Jun. 16, 2011.
Official Action corresponding to U.S. Appl. No. 12/567,017 dated Mar. 20, 2012.

* cited by examiner

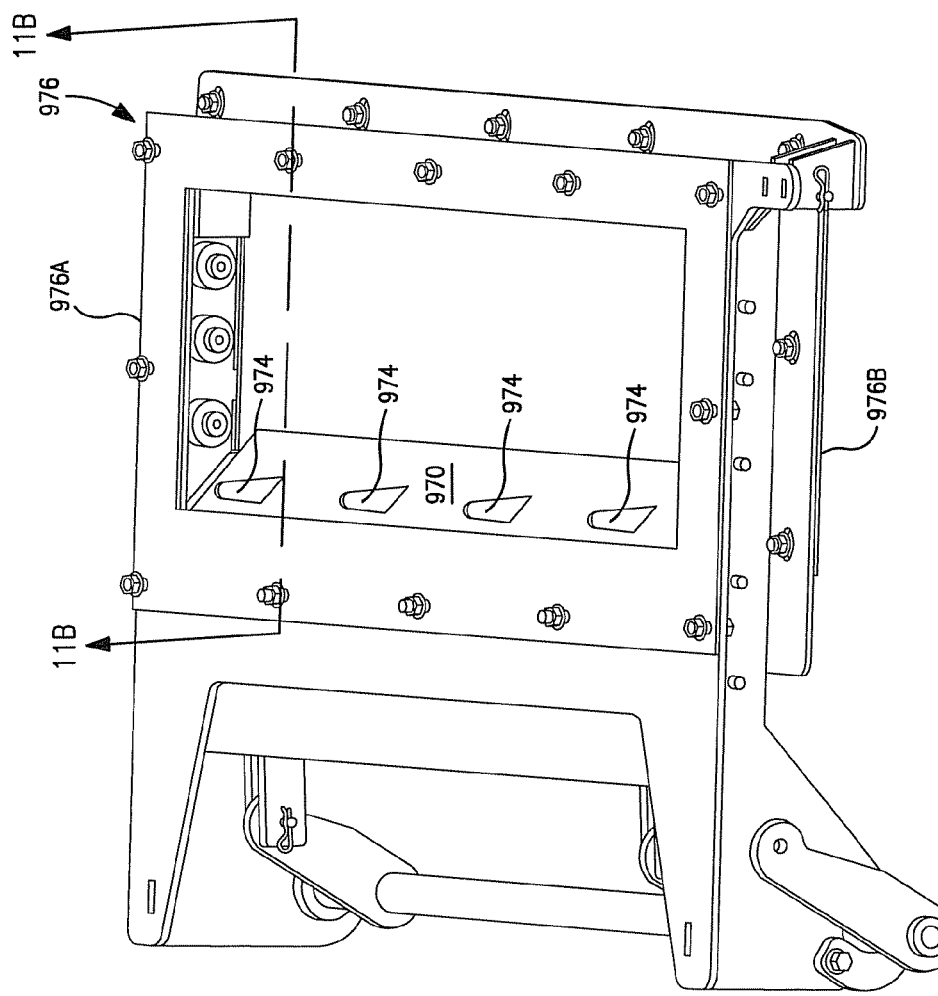

APPARATUSES AND METHODS FOR BULK DISPENSING

RELATED APPLICATIONS

This application is a continuation-in-part patent application which claims the benefit of the filing date of U.S. patent application Ser. No. 11/332,963, filed Jan. 17, 2006 now U.S. Pat. No. 7,640,075 that claims the benefit of U.S. Provisional Patent Application Ser. No. 60/696,086, filed Jul. 2, 2005; the disclosure of both applications being incorporated herein by reference in its entirety.

TECHNICAL FIELD

The present subject matter relates generally to hoppers use to supply products in bulk to a product user. In particular, the present subject matter relates to apparatuses and methods that facilitate dispensing of bulk product from a hopper.

BACKGROUND

Current systems for distribution of products to end-users typically require dealers and distributors to hand deliver the products to the end-user or use a vending machine, where end-users select the product previously loaded into the vending machine. For delivery directly by a dealer, distributor, or other transferring entity (dealer), end-users must typically take possession of products during the hours that the dealer is open for business. Distribution of bulk and packaged products is done manually. By way of example, for bulk plant seed, a dealer will typically transfer the seed from the dealer's storage container into a grower's container, such as a truck box, seed wagon or seed tender unit. Alternatively, the dealer may transfer its storage container containing the product directly to the grower. The grower then transports the product in the storage container to its end use. Allowing the end-user or grower to carry away the storage containers requires that the dealer stock a large number of often very expensive storage containers. The growers often keep the containers until after the planting season, making them unavailable for further use by the dealer that season.

To best serve its end-users, dealers will typically pay workers significant overtime to keep a facility open and to deliver products to the end-users before and after hours. This is especially true for dealers of agricultural products.

A particular storage container used in numerous industries is referred to as a "hopper." A hopper is a funnel-shaped container in which materials, including such things as seed, grain, coal, or fuel are stored in readiness for dispensation. Freight trucks and trains often store, transport and dispense materials using hoppers. Hopper dispensing doors or gates are typically flat and are located at the bottom end of the funnel-shaped hopper. A recurring problem that occurs during dispensation is the crusting or bridging of the stored materials at the bottom of the hopper due to gravity compaction of the stored materials. Typical unblocking solutions involve the use of poles, hammers, and other similar tools to manually stir or otherwise break up the blockage. These methods take time and can cause injury to the person trying to unblock the material and can cause harm to the hopper itself.

To date, there is no apparatus and method that provides for receiving orders for products and subsequently providing an automatic, all-time delivery of the products to the end-user at a remote site. There is also no method or apparatus for automatically dislodging stored material that has compacted and lodged itself at the bottom opening of the hopper.

SUMMARY

The present disclosure provides apparatuses and methods for facilitating bulk dispensing from a hopper. An object of the present disclosure is to provide apparatuses and methods that can dislodge material within a hopper to facilitate bulk dispensing.

For example, in one aspect of the present subject matter, a hopper door is provided that can include a frame and a slide gate disposed within the frame that is retractable between an open position and a closed position. A set of fingers can be provided that project from the slide gate to dislodge material proximate to the hopper door. In some embodiments, the hopper door can be located beneath a hopper structure having a product storage receptacle. Also, the slide gate can include a downwardly sloped portion angled from a horizontal position of the frame. The set of fingers can project upward above the frame. Further, in some embodiments, the set of fingers can contact a side wall of the hopper structure when the slide gate is in the closed position. In other embodiments, the set of fingers can reside adjacent a side wall of the hopper structure when the slide gate is in the closed position. In some embodiments, one or more ports can be positioned in the hopper structure to inject fluid into the hopper structure. In some embodiments, one or more ports can be positioned in the slide gate to supply fluid into the hopper structure. Further, one or more nozzles can be suspended within the hopper structure with the one or more nozzles configured to supply fluid into the hopper structure.

In another aspect of the present subject matter, a hopper is provided that includes hopper walls that form a product storage receptacle and a hopper door. The hopper door can include a frame and a slide gate disposed within the frame that is retractable between an open position and a closed position. The hopper door can also include a set of fingers projecting from the slide gate to dislodge material proximate to the hopper door. A port can be provided through at least one of the fingers of the set of fingers with the port configured to inject a fluid into the hopper to further dislodge material within the hopper. In some embodiments, each finger of the set of fingers can include a port configured to inject a fluid into the hopper. In some embodiments, the ports can comprise a nozzle. In other embodiments, the ports can be formed by a passage drilled through the respective finger. A fluid supply system can be provided that is configured to supply fluid to the ports by fluid lines to supply fluid into the hopper. In some embodiments, one or more ports can be positioned in the hopper walls to inject fluid into the hopper. In some embodiments, one or more ports can be positioned in the slide gate to supply fluid into the hopper. Further, one or more nozzles can be suspended within the hopper between the hopper walls with the one or more nozzles configured to inject fluid into the hopper to dislodge material within the hopper. In some embodiments, the ports, including ports formed by nozzles, can be configured to supply a solid material with the fluid into the hopper.

In another aspect of the present subject matter, a hopper is provided that includes hopper walls that form a product storage receptacle with the hopper walls converging toward a dispensing opening. The hopper also includes a hopper door for covering the dispensing opening. The hopper door can include a frame and a slide gate disposed within the frame with the slide gate being retractable between an open position and a closed position. The hopper door can also include a set of fingers projecting from the slide gate to dislodge material proximate to the hopper door. The hopper can include fluid ports positioned through each finger of the set of fingers, one or more fluid ports positioned through the hopper walls, and one or more ports positioned in the slide gate. Each of the ports can be configured to inject a fluid into the hopper. A fluid supply system can be provided that is configured to supply fluid to the fluid ports by fluid lines to supply fluid into the hopper. In some embodiments, one or more nozzles can be suspended within the hopper between the hopper walls with the one or more nozzles configured to inject fluid into the hopper to dislodge material within the hopper. In some embodiments, the ports, including ports formed by nozzles, can be configured to supply a solid material with the fluid into the hopper.

In a further aspect of the present subject matter, a method of supplying material through a hopper is provided. The method includes providing a hopper that comprises hopper walls that form a product storage receptacle and a hopper door. The hopper door can have a frame, a slide gate disposed within the frame that is retractable between an open position and a closed position, and a set of fingers projecting from the slide gate. The hopper door can further have a port through at least one of the fingers of the set of fingers. The method also includes opening the slide gate of the hopper door such that the fingers dislodge material within the hopper proximate to the hopper door. The method further includes injecting fluid through the port in the at least one finger into the hopper to dislodge material within the hopper.

In some embodiments, each finger of the set of fingers of the slide gate includes a port such that the method can further include injecting fluid through each port in the fingers into the hopper to dislodge material within the hopper above the fingers. In some embodiments, the hopper includes one or more ports positioned in the hopper walls such that the method can further include injecting fluid through the one or more ports positioned in the hopper walls to dislodge material within the hopper. In some embodiments, the hopper includes one or more ports positioned in the slide gate such that the method can further include injecting fluid through the one or more ports positioned in the slide gate to dislodge material within the hopper. In some embodiments, the hopper includes one or more nozzles suspended in the hopper between the hopper walls such that the method can further include injecting fluid through the nozzles suspended in the hopper to dislodge material within the hopper. In some embodiments, the method can include injecting solid material with the fluid through the ports to facilitate the dislodging of the material within the hopper.

The hopper apparatus of the disclosure thus includes a hopper and hopper gate also referred to herein as a "slide gate." The slide gate, upon sliding to its open position, simultaneously dislodges crusted, bridged, or otherwise blocked material, allowing such material to freely exit the hopper.

An object of the presently disclosure having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures.

FIGS. 9A and 9B illustrate embodiments of a closed and an open hopper slide gate, respectively, with fingers, according to the present disclosure.

DETAILED DESCRIPTION

Reference will now be made in detail to the description of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

In the Figures, the first digit of a reference number refers to the Figure in which it is used, while the remaining two digits of the reference number refer to the same or equivalent parts of embodiment(s) of the present disclosure used throughout the several figures of the drawings. The scaling of the figures does not represent precise dimensions of the various elements illustrated therein.

The present disclosure relates to apparatuses and methods for self-service, automatic distribution of bulk and package products. In the embodiments described herein, the products ordered, delivered and distributed according to the apparatus and method of the present disclosure are agricultural products, including bulk seed, seed pre-packaged in large containers or bags, and pre-packaged chemicals. Other agricultural and industrial products also may be distributed according to the present disclosure. The apparatus and method of the present disclosure may be used for products and distribution systems of other industries. For example, certain aspects of the disclosure may be particularly relevant to the freight truck and train transport industry.

Figure 1:
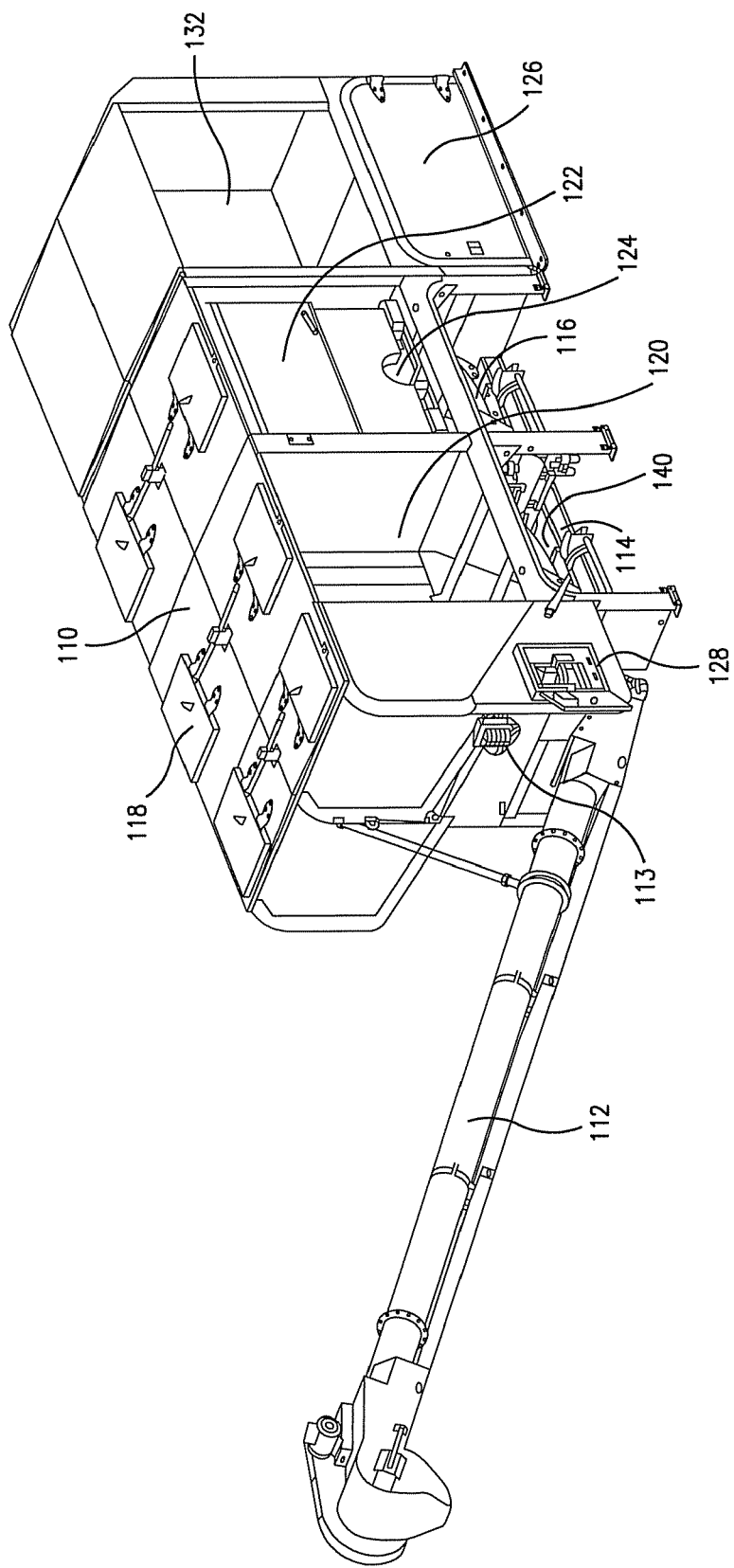
FIG. 1 illustrates an embodiment of an apparatus suitable to facilitate dispensing of products, according to embodiments of the present disclosure.

Referring to FIG. 1, the hopper apparatus 110 of the disclosure provides for automatic all-time delivery of product to an end-user at a remote site. Hopper apparatus 110 includes a number of different product storage receptacles, including an integral large container/bulk storage receptacle 120, referred to hereinafter as the "receptacle." Receptacle 120 accepts container 122, such as a center flow container manufactured by Buckhorn Inc. Another container that is compatible with the hopper apparatus of the disclosure is the Q-Bit PLUS® container. Receptacle 120 may also accept similar containers that have off-center bottom openings, such as bottom openings located at a bottom corner of the container. An off-center bottom opening container known to the industry is the Q-Bit® container.

Figure 2:
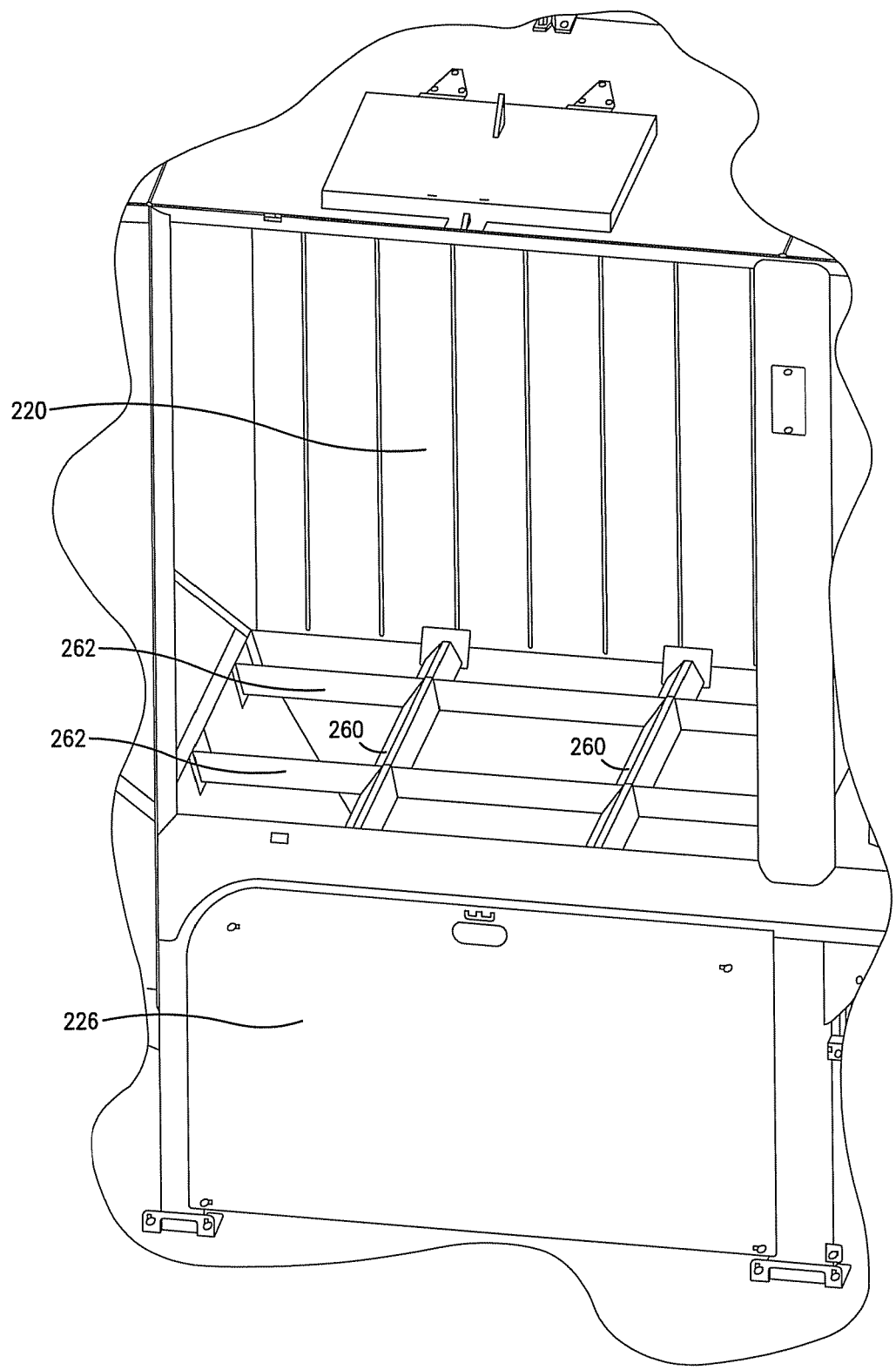
FIG. 2 illustrates an embodiment of a product package support base within a storage receptacle of the product dispensing apparatus.

FIG. 2 shows receptacle 220 and a product package support base comprising two or more container support rails 260 and two or more floor support rails 262. The rails 260 and 262 are beveled so that non-packaged bulk product, such as grain, falls into the hopper without collecting on rails 260 and 262. "Product package support base" refers to a base that bears products residing within a package or packages, such as container 220, individual product bags, a pallet of packaged products, or any other form or configuration of packaged product. The product package support base of the disclosure allows receptacle 220 to be used for bulk storage or for storage of packaged product.

In one embodiment, floor support rails 262 are positioned so that their top surface is slightly below the top surface of support rails 260, allowing such things as pallets (not shown) and containers such as container 122 to slide on container support rails 260 without catching on intersecting rails 262. Other support bases may be used according to the present disclosure, provided such bases do not encumber loading of material and containers, pallets, and other product packages into receptacle 220, are able to hold substantial weight, and allow bulk material to flow unimpeded into hopper 116 and receptacle 220.

Figure 3:
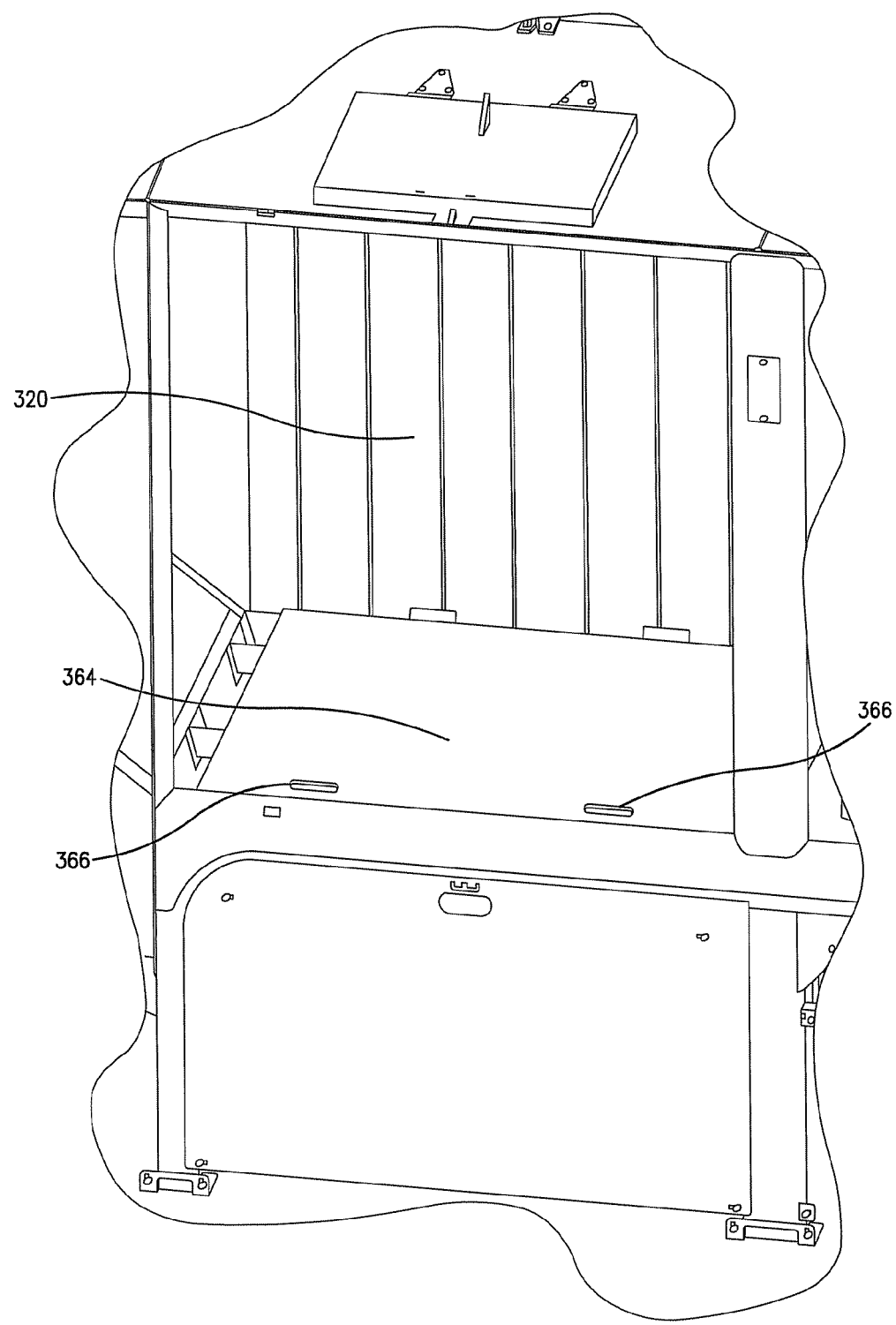
FIG. 3 illustrates an embodiment of a removable floor positioned within a storage receptacle of the product dispensing apparatus.

The present disclosure also includes a removable floor 364 having hand holds 366 as shown in FIG. 3. Removable floor 364 can be inserted into receptacle 320 and placed on top of rails 260 and 262 shown in FIG. 2. Removable floor 364 provides more storage flexibility for the hopper system by allowing users to store bags and packaged items in receptacle 320. When removable floor 364 is not in use, it may be stored and locked on any appropriate unused surface, e.g., receptacle 320, or within any available space thereof.

Figure 4:
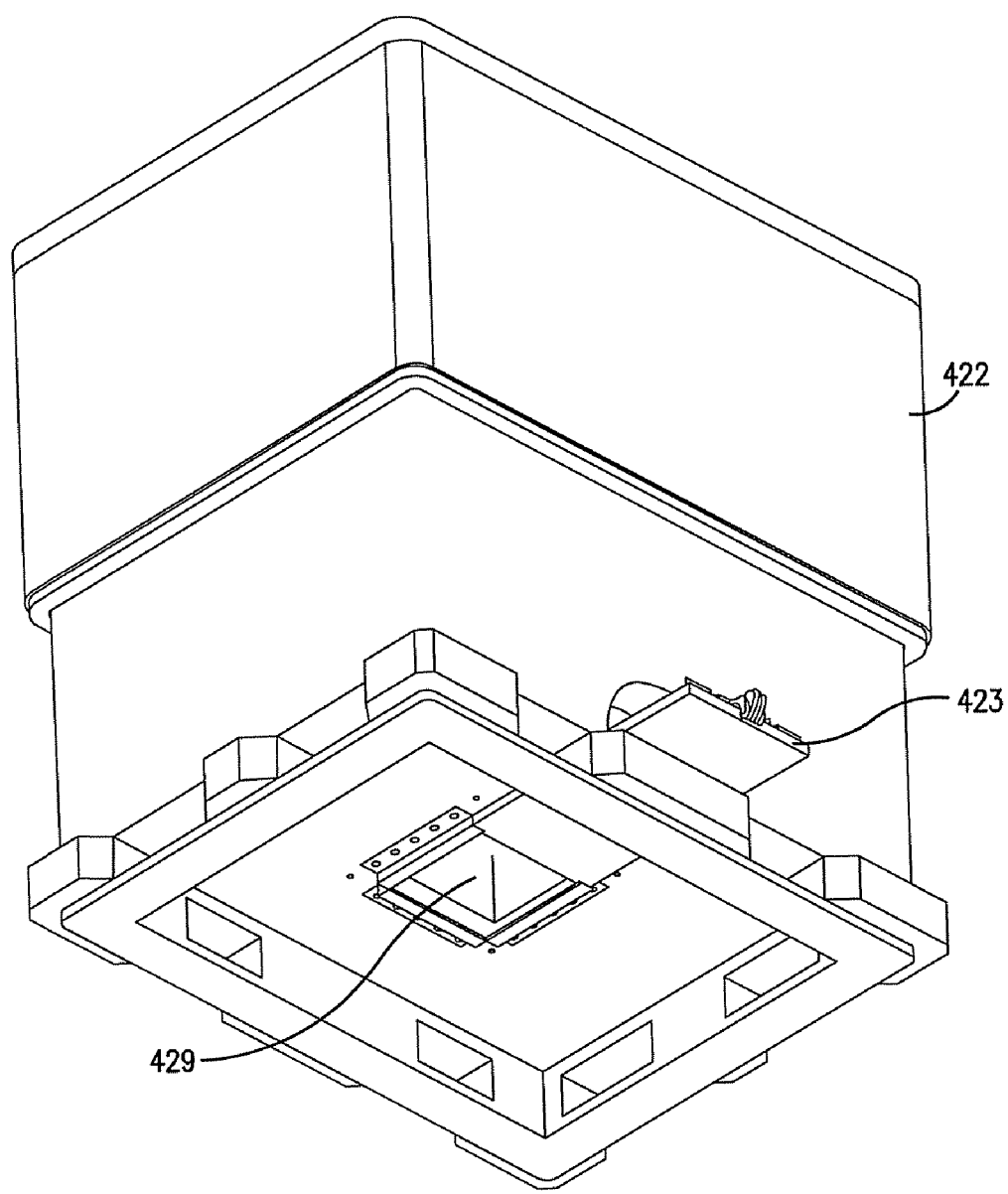
FIG. 4 illustrates an embodiment of a product container for placement within a storage receptacle of the product dispensing apparatus.
Figure 5A:
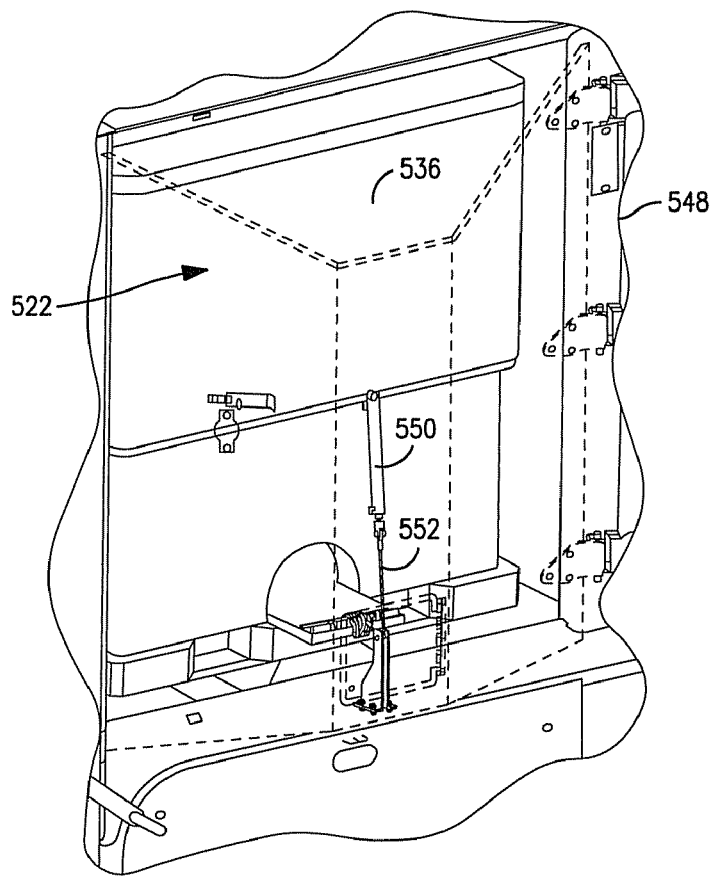
FIGS. 5A and 5B illustrate embodiments of a cable and pulley device for allowing exit of product from a storage receptacle of the product dispensing apparatus.
Figure 5B:
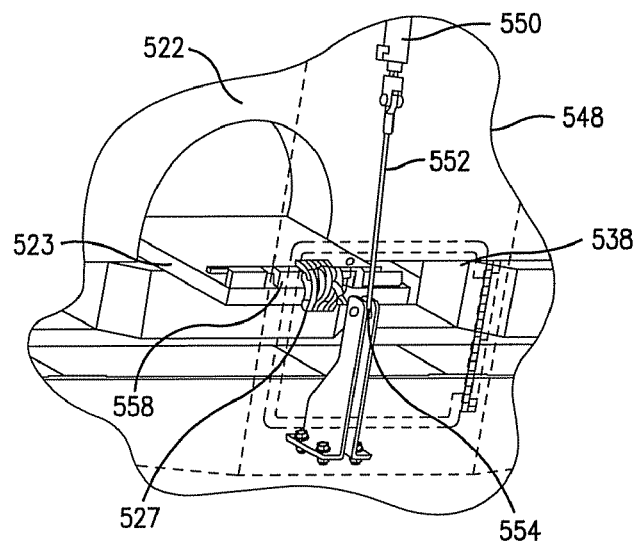
Figure 6:
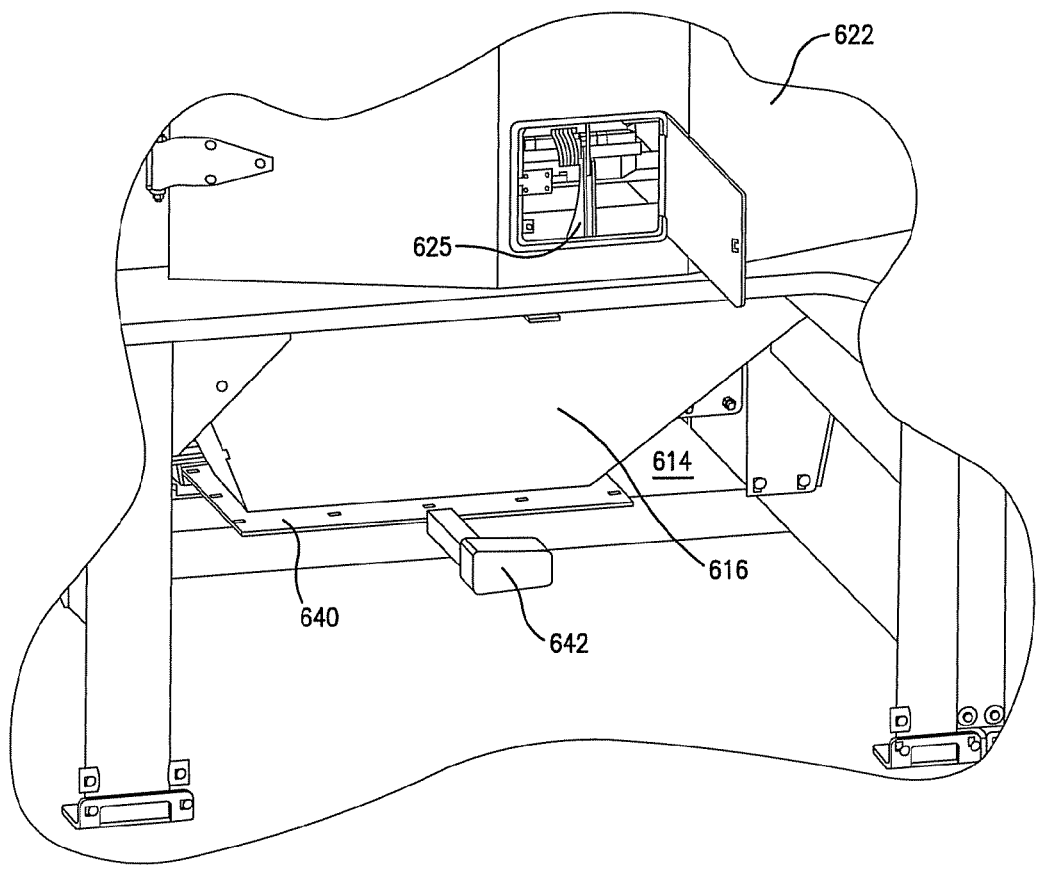
FIG. 6 illustrates an embodiment of a hopper slide gate through which product exits onto a horizontal conveyor of the product dispensing apparatus.

Referring to FIG. 4, container 422 includes an interior funnel hopper-like structure (not shown) featuring smooth sides and a funnel shape, e.g., cone-shape, for complete emptying without tipping. In one embodiment, container 422 also includes a side exit slide door, such that when opened the products contained in container 422 are emptied through the side of container 422. Container 422 also includes bottom exit slide door 423 as shown in its open position in FIG. 4. Bottom exit slide door 423 is opened and closed using a cable and pulley system 548, as shown in FIGS. 5A and 5B. An electric, air, or other type powered actuator 625, as shown in FIG. 6, is operably associated with bottom exit slide door 523 via clamp 527 and to a controller, such as a programmable logic control (PLC) 128 (FIG. 1). It is recognized that it is within the scope of the disclosure to manually open slide door 523.

A source of compressed air that serves the air powered actuator 625 can be connected to an output device (e.g., a hose) so as to provide pressurized air that can be operated by a user (e.g., an inventory provider) to clean out the storage receptacles of the dispensing apparatus before product has been placed in the receptacles by the inventory provider and after product has been removed by the end-user. The source of compressed air can be from a fluid supply system 1491 (See FIGS. 14A and 14B) which can include an air compressor. Fluid supply system 1491 is described in more detail below. The pressurized air so provided also can be used by inventory providers and end-users for other purposes related to dispensing product, e.g., increasing air pressure within tires of a transport vehicle after loading large quantities of product onto the transport vehicle. Making pressurized air available to users can increase the desirability of obtaining large quantities of product from the dispensing apparatus.

Referring to FIGS. 5A and 5B, the cable and pulley system 548 is operated by means of air cylinder 550. Cable and pulley system 548 includes air cylinder 550 operably connected to one end of cable 552. Cable 552 is mounted around pulley 554 which is held within bracket 558. The second end of cable 552 is attached to clamp 527, which is secured to exit slide door 523 by use of bracket 558. It is within the scope of the present disclosure to use any known mechanism and system now or hereafter known to open and close slide exit door 523.

According to the present disclosure, door 536 includes inner and outer panels creating a hollow cavity within. The container opening device 548 is located within the cavity of door 536.

In order to engage the automatic slide door 523 opener system of the disclosure, clamp 527 must be secured to slide door 523 of container 522. The individual delivering container 522 to receptacle 120 (FIG. 1) must close door 536 and open cavity access door 538 and side door (not shown) of container 522. Keeping slide door 523 in its closed position, the user secures clamp 527 to bracket 558 and slide door 523.

The process of opening exit slide door 523 is initiated by PLC 128, wherein in one embodiment a user ID and password is entered and instructions are provided to PLC 128 to open a particular exit slide door 523, an air compressor (not shown) supplies air pressure to retract air cylinder 550. Air cylinder 550 is in a fully extended position while the slide door 523 is in its closed position. Upon retraction of air cylinder 550, cable 552 moves in an outward direction pulling slide door 523 open. Therefore, the present disclosure also includes an automatic mechanism and method for opening slide door 523 of container 522, without having to modify container 522, wherein container 522 may be a standard Q-Bit PLUS® or Q-Bit® container currently used in the marketplace. However, it is to be understood that various other containers also may be used successfully in the apparatus and method of the present disclosure.

FIG. 1 further shows hopper 116. Hopper 116 is positioned below container 422 and container opening 429 (FIG. 4), such that when slide door 423 is opened, the product in container 422 falls into hopper 116. Hopper 116 is operably associated with slide gate 140. Slide gate 140 is further illustrated in FIGS. 6, 9A, and 9B, and is described in further detail below. Referring to FIG. 6, when slide gate 640 is opened, seed released from container 622 falls through discharge opening of hopper 616 onto horizontal conveyor 614. Horizontal conveyor 614 is continuous with or otherwise associated with vertical conveyor 112 (FIG. 1), such that seed from container 622 is conveyed up vertical conveyor 112 and released to the receiving container of the end-user, such as a truck box, seed wagon, or seed tender unit. In FIG. 1, vertical conveyor lift motor 113 operates to raise and lower vertical conveyor 112, it being understood that a manual hand winch can be used in place of lift motor 113. Thus, PLC 128 of hopper apparatus 110 causes the automatic opening of container 422 bottom exit door 423 (FIG. 4) and hopper slide gate 640 (FIG. 6) for delivery to the conveyor system comprising, in one embodiment of the disclosure, a horizontal conveyor 614 (FIG. 6) and vertical conveyor 112 (FIG. 1).

Figure 7:
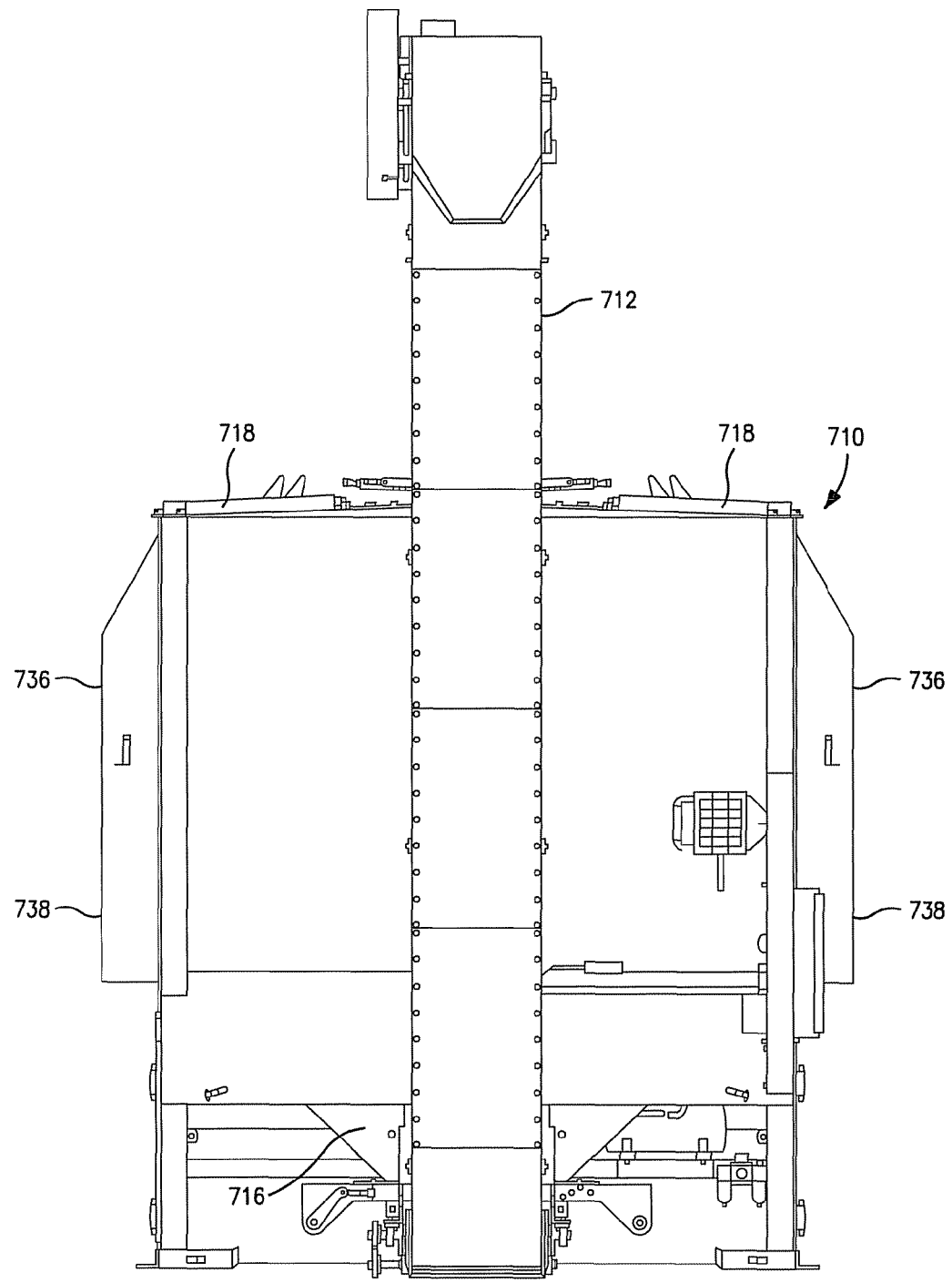
FIG. 7 illustrate an embodiment of an end of the apparatus with which a vertical conveyor is associated for dispersal of product.

Referring again to FIG. 1 along with the end view of FIG. 7, integral receptacle 120 is also designed to hold bulk product. Bulk product is loaded into receptacle 120 through fill access ports 118 and 718, respectively. Each receptacle door, e.g., 536 in FIG. 5A and 736 in FIG. 7 includes a hatch door, e.g., 538 in FIG. 5B and 738 in FIG. 7.

Referring to FIG. 6, slide gate 640 is shown at the bottom of hopper 616. Slide gate 640 is linked to an air, electric or other type powered actuator 642. When slide gate 640 is in its closed position, product is held within hopper 616. When slide gate is opened, product is emptied onto horizontal conveyor 614, subsequently transferred to vertical conveyor, shown as 112 in FIG. 1, and is ultimately transferred to end-user container (not shown) located under the output end of vertical conveyor 112.

Slide gate 640 of the present disclosure is specially formed to actively discharge material stored in receptacle 120 or in a container 122 (FIG. 1). Solid bulk products (e.g., grain, seed, pellets, dry distillers grain, flour, milk powder, cement, clay and other non-liquid materials) tend to form a crust at the bottom discharge openings of bulk storage and transportation hoppers. Upon opening of the hopper gates, the gravity compaction of crust prevents the "mass flow" of product from the hopper.

Similarly, in some types of bulk materials, a densely packed bridge is often formed by settling of small particles, distribution of various particle sizes, moisture absorption, relative humidity, temperature, and vibrations during transport or storage and product cohesiveness. "Funnel compaction" results in the formation of stagnant compacted material around the sides causing material to flow through a small hole from the top of the hopper through the stagnant compacted material. This hole is referred to the industry as a "rat hole." Funnel compaction also prevents the mass flow of material through discharge opening of a hopper.

Figure 8:
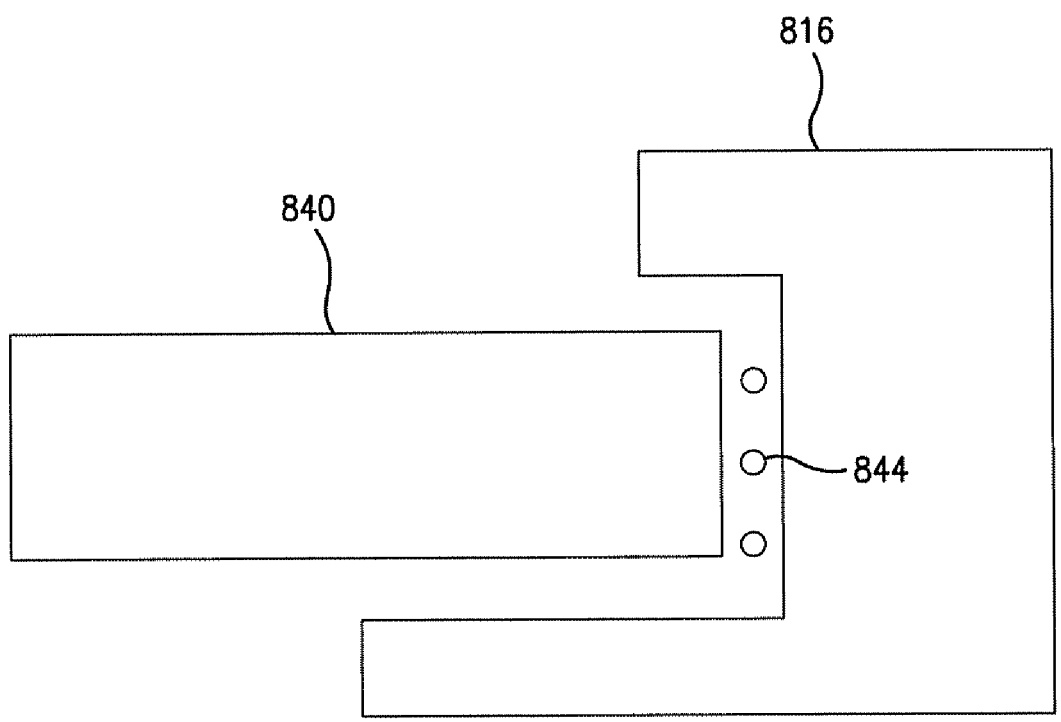
FIG. 8 illustrates a prior art example of a current hopper slide gate closure mechanism.

A further problem with discharging materials stored in hoppers is that hopper gates are currently flat and formed on a substantially horizontal plane. Thus, even when fully open, stored material remains on top of the horizontal gate and often gets wedged 844 into the hopper slide gate (male) 840 and frame (female receptor) 816 as shown in FIG. 8 when closed.

As will be described in more detail next, embodiments of the present disclosure provide a slide gate 640 (FIG. 6) that upon sliding to its open position disturbs crust and funnel compacted material at and around the discharge opening, thereby freeing the product to mass flow through discharge opening to conveyor 614 below. As such, embodiments of the slide gate 640 according to the present disclosure are self-cleaning.

Figure 9A:
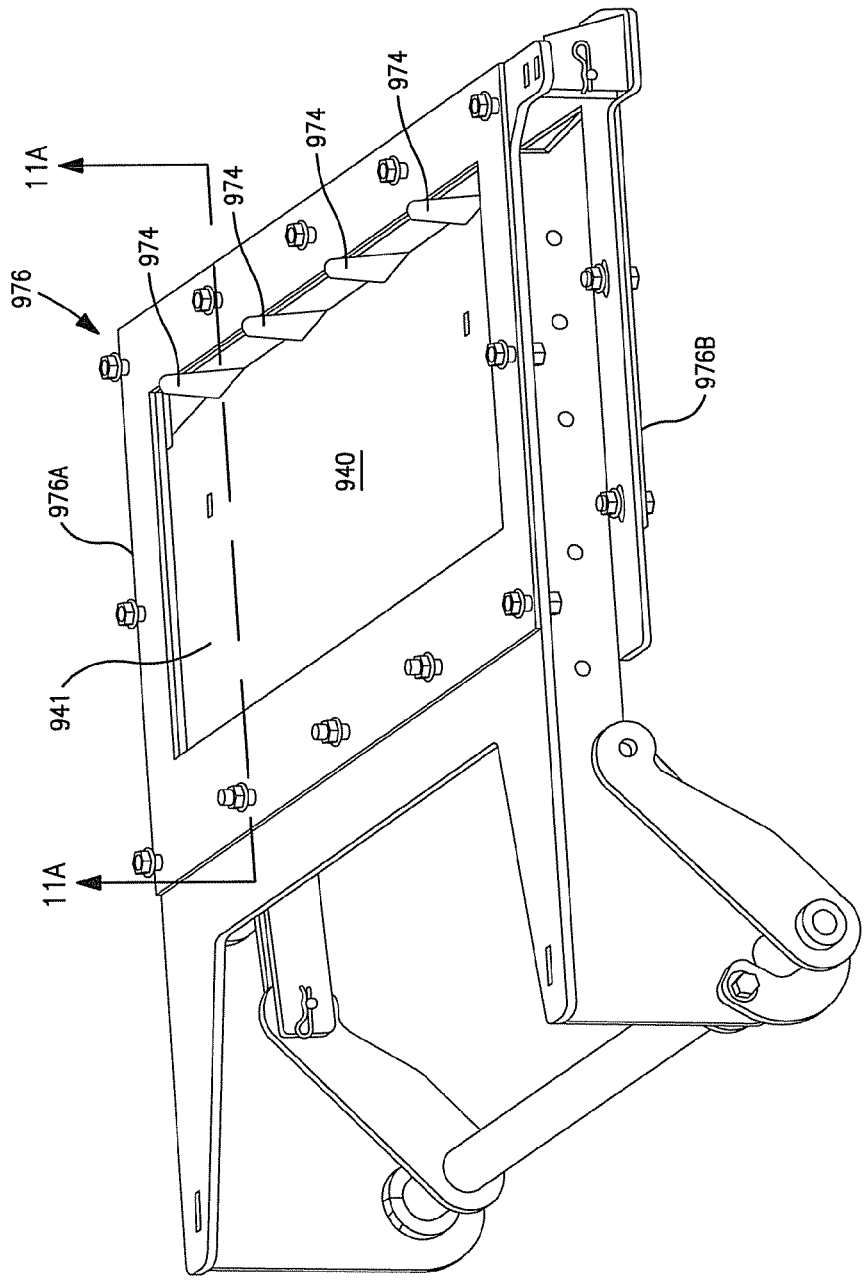
Figure 10:
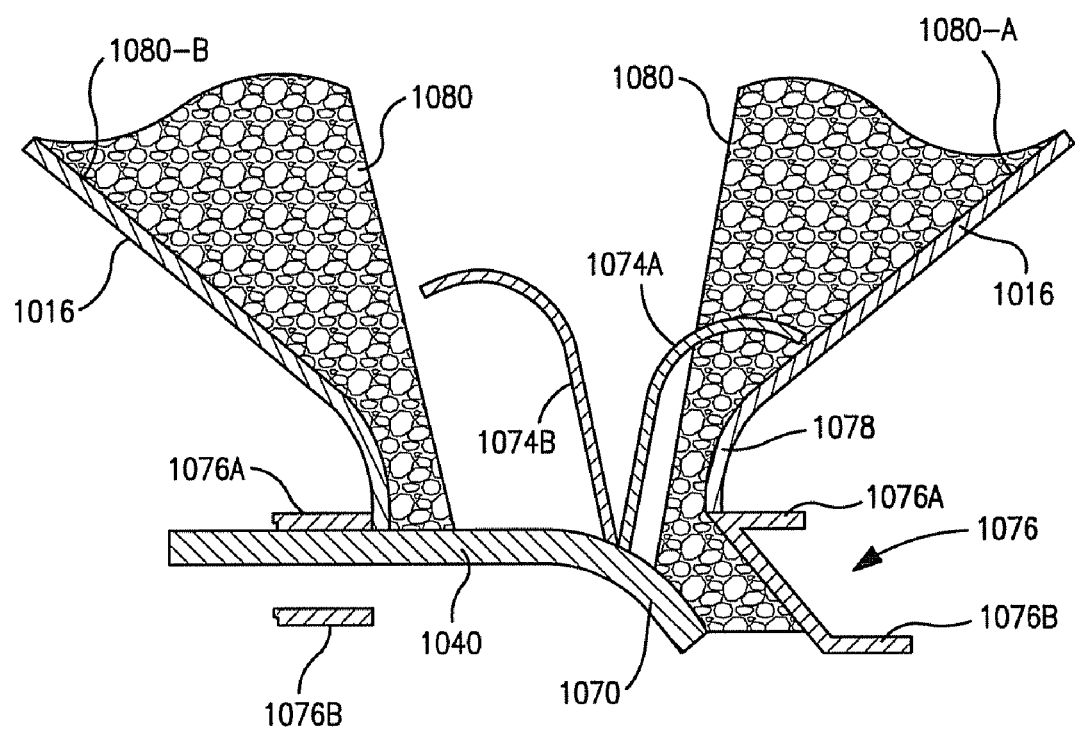
FIG. 10 illustrates an embodiment of a hopper slide gate with alternative finger configurations.

FIGS. 9A, 9B, and 10, illustrate in more detail embodiments of a hopper door 941 including a slide gate 940 and 1040, respectively, of the present disclosure. The hopper door 941 includes a frame 976, illustrated with a rectangular geometry, to which a hopper cone (shown as 616 in FIG. 6) can be mounted. Embodiments, however, are not limited to the particular rectangular frame geometry provided in this example. The frame 976 defines an opening above the slide gate 940 and can include a top member 976-A and a bottom member 976-B. The slide gate, e.g., 940, is disposed between the top member 976-A and the bottom member 976-B and can travel therebetween, e.g., on roller, bearings, etc., to be retractable between an open position (FIG. 9B) and a closed position (FIG. 9A). As shown in the embodiments, a set of fingers, e.g., 974 and 1074 respectively, project vertically from the slide gate 940 and 1040, respectively, to dislodge material from the hopper, e.g., hopper cone (shown as 616 in FIG. 6). The set of fingers 974 and 1074, respectively, are located on a leading edge 970 and 1070, respectively, of slide gate 940 and 1040, respectively, and extend upwards from the top of slide gate 940 and 1040, respectively, into hopper discharge opening. Depending on the product stored in hopper 116 and receptacle 120 (FIG. 1) and the type of flow problems, fingers 974 and 1074, respectively, can vary in length, diameter, number, and shape. For example, if the product is slightly damp grain that forms a crust, fingers 974 may be only a couple of inches long and be still effective in breaking the crust, as shown in FIGS. 9A and 9B.

However, referring to FIG. 10, if the product is dry distillers grain that discharges as a "funnel flow," fingers 1074 may be a foot or more in length and shaped like inverted spoons. Fingers 1074A and 1074B are pointed towards and away, respectively, from leading edge 1070 of slide gate 1040. When slide gate 1040 is opened, the forward pointing fingers 1074-A break through the crust, bridge or funnel compaction releasing the product for mass flow from the proximate interior wall 1080-A. Likewise, when slide gate 1040 is opening, the backward pointing fingers 1074-B break the bridge of funnel compaction formed on the opposing interior wall 1080-B of hopper 1016. The action of opening and closing of slide gate 1040 allows fingers 1074 to disrupt the compacted stored materials and allows for mass flow to a waiting conveyor 614 (FIG. 6) or other material receiving device.

As one of ordinary skill in the art will appreciate upon reading this disclosure the slide gate 940 and 1040, having a particular configuration to the set of fingers 974 and 1074, respectively, can be interchangeably replaced with another slide gate having a different particular configuration of the set of fingers, as suited to use with a particular product to be dispensed through the hopper, by opening the hopper door frame 976, e.g., disconnecting bolts connecting the top member 976-A to the bottom member 976-B and placing a different slide gate therebetween.

FIGS. 9A, 9B, 10, and 11 show that the present disclosure further provides a slide gate 940, 1040, and 1140, respectively, with a downwardly sloped leading edge 970, 1070, and 1170, respectively, which may pass between the top member 976-A and bottom member 976-B of the frame 976 to seal the hopper discharge opening. The downwardly sloping leading edge, e.g., 970, provides the self-cleaning aspect of the present disclosure by allowing stored material to slide downward to conveyor 614 rather than remaining on top of the slide gate and/or remaining between the gate 940 and hopper frame 976 in FIG. 9.

The leading edge, e.g., 970, of the present disclosure is also bent for structural support. Bent metal, depending on the bend angle, has increased weight-bearing capacity compared to a flat metal structure. The slide gate 940 of the present disclosure has approximately three times the structural support capacity compared to a flat horizontal hopper gate. Providing a bend in the slide gate provides for two functions: self-cleaning and increased strength.

FIGS. 11A-11B and 11C-11D illustrate cross sectional views of the slide gate 1140 in operable combination with the hopper 1116 from a side view and top down view, respectively, taken along cut-lines 11A-11A in FIG. 9A and cut-lines 11B-11B in FIG. 9B respectively.

Figure 11A:
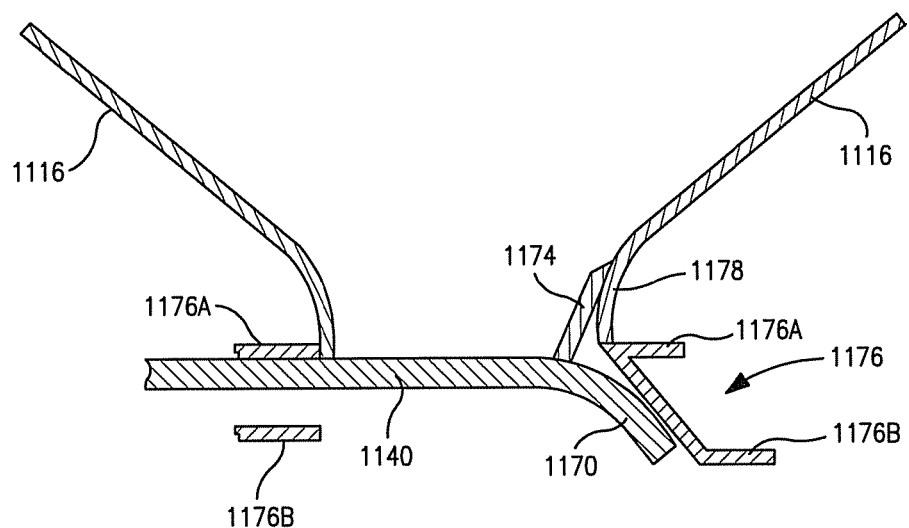
FIGS. 11A-11D illustrate embodiments of a hopper slide gate including top and side cross-sectional views taken along cut-lines 11A-11A and 11B-11B in FIGS. 9A and 9B.

FIG. 11A shows in further detail the side view for slide gate 1140, in a closed position, in operable combination with hopper 1116. As hopper slide gate 1140 closes, the vertical fingers 1174 closely approach or touch the hopper frame. The hopper door frame 1176 (illustrated as "frame" 976 from an above perspective view in FIGS. 9A and 9B) is bolted or otherwise secured to hopper 1116. When slide gate 1140 is fully in its closed position, the downwardly sloping leading edge 1170 can mate flush with the discharge periphery 1178 of the hopper cone 1116 and the hopper door frame 1176, e.g., "frame" 976 in FIGS. 9A and 9B. As mentioned in FIGS. 9A and 9B, the hopper can be secured to the hopper frame 1176 such that the leading edge 1170 of the slide gate 1140 can pass between a top member 1176-A and a bottom member 1176-B of the hopper door frame 1176. The fingers 1174 on the downward sloping leading edge 1170 of slide gate 1140 can mate flush with an inner wall of the hopper 1116 when the slide gate 1140 is in the closed position.

Figure 11B:
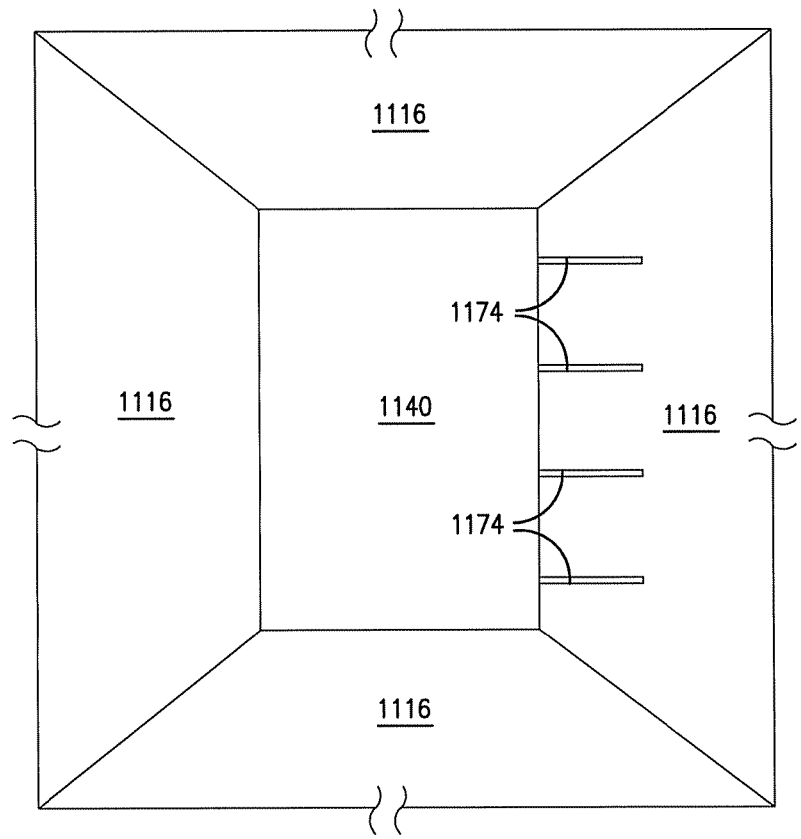

FIG. 11B illustrates a top down view of FIG. 11A when the slide gate 1140 is in the closed position. Hence, the view illustrates interior walls of the hopper 1116, a top surface of the slide gate 1140, and the set of fingers 1174 resting against the interior walls of the hopper 1116.

Figure 11C:
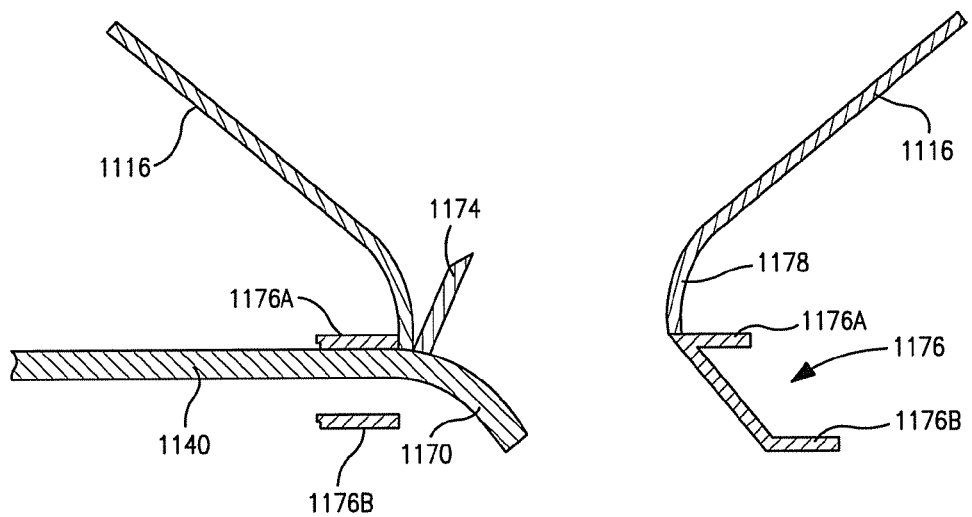

FIG. 11C shows in further detail the side view for slide gate 1140, in an open position, in operable combination with hopper 1116. As hopper slide gate 1140 opens, the vertical fingers 1174 move away from the hopper frame, e.g., interior walls of the hopper 1116. When slide gate 1140 is fully in its open position, the downwardly sloping leading edge 1170 can mate flush with opposing side of the hopper door frame 1176. The opposing sides of the hopper interior walls 1116 again are secured to the hopper frame 1176. As illustrated in the example embodiment of FIG. 11C, the leading edge 1170 of the slide gate 1140 can be retracted to stop in line with the opposing side of the hopper interior wall 1116 again at the hopper door frame 1176. The fingers 1174 on the downward sloping leading edge 1170 of slide gate 1140 will remain projecting into the hopper discharge opening.

Figure 11D:
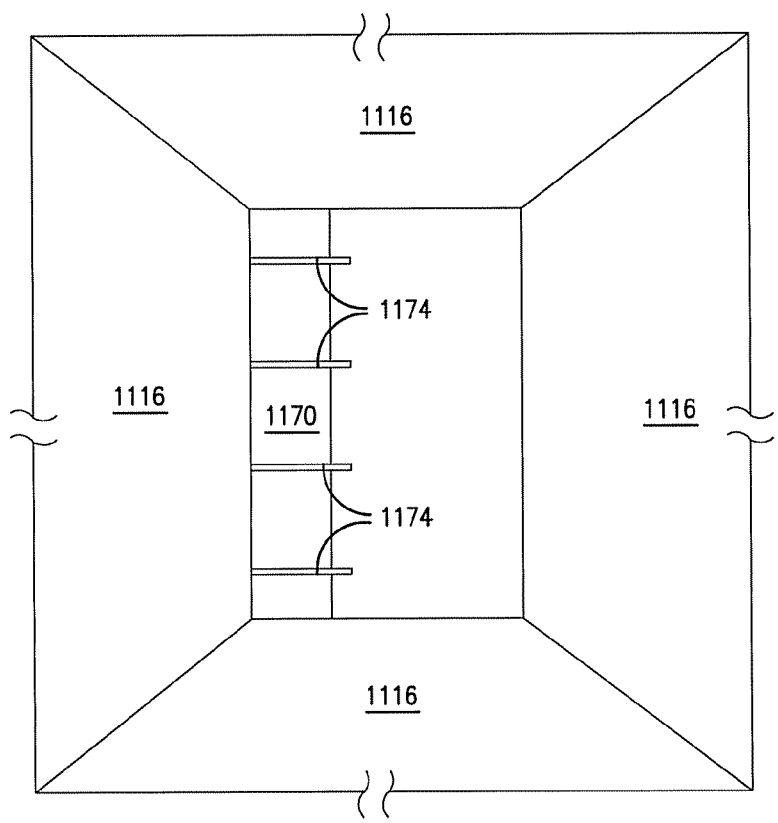

FIG. 11D illustrates a top down view of FIG. 11C when the slide gate 1140 is in the open position. Hence, the view illustrates interior walls of the hopper 1116, a top surface of the slide gate 1140, and the set of fingers 1174 resting against the interior walls of the hopper 1116.

Figure 12:
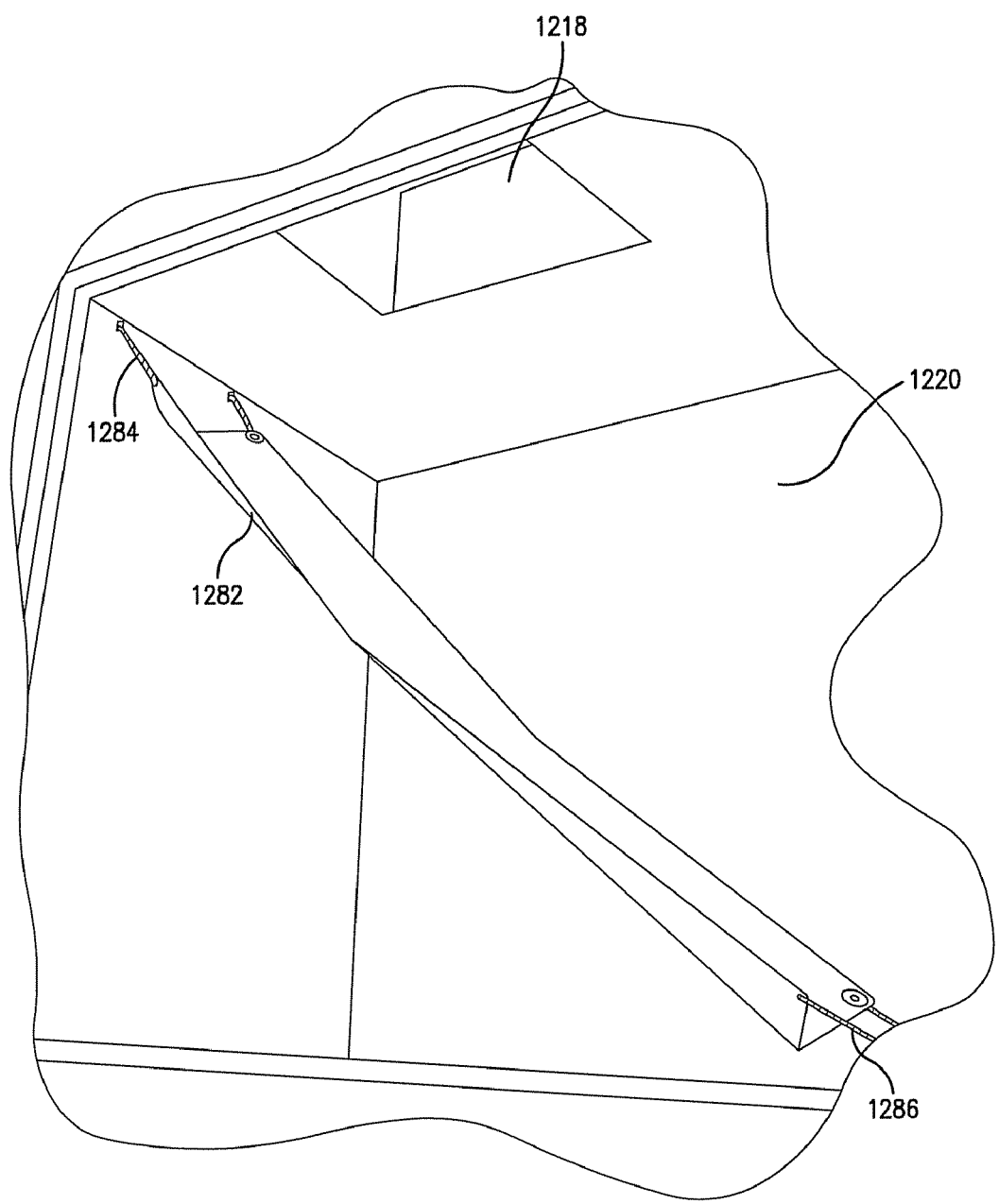
FIG. 12 illustrates an embodiment of a product deflector onto which product is loaded within a storage receptacle of the product dispensing apparatus.
Figure 13A:
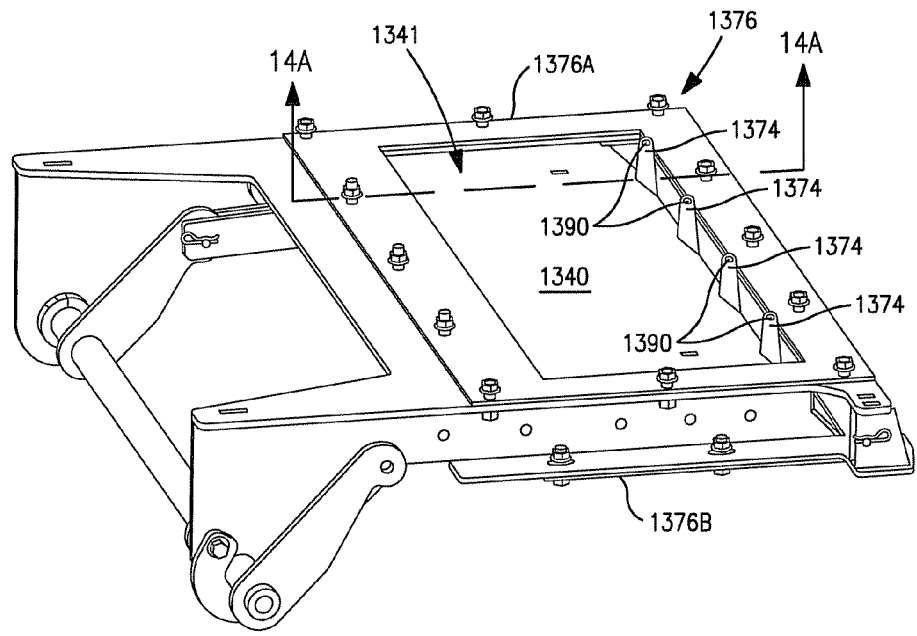
FIGS. 13A and 13B illustrate perspective views of an embodiment of hopper slide gate in a closed and an open, respectively, with fingers and fluid ports for introducing fluid into a hopper, according to the present disclosure.
Figure 13B:
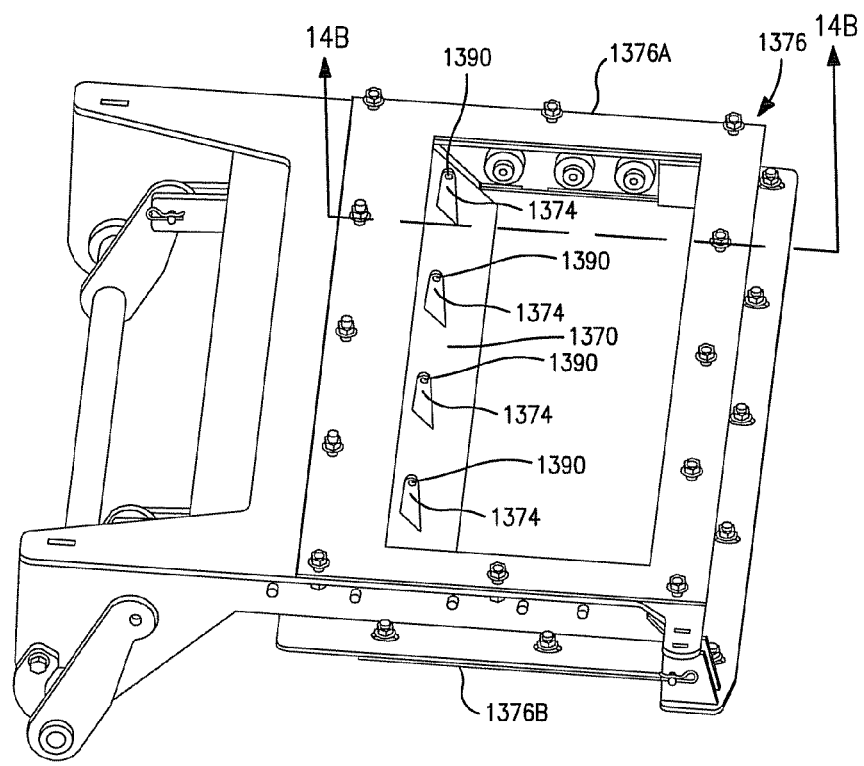

FIG. 12 illustrates a product slide 1282 for gentler introduction of bulk material into receptacle 1220. Product slide 1282 is located directly below port 1218 and having one end attached to the upper portion of receptacle 1220 and a lower end attached to the lower end of receptacle 1220, thereby forming a slide. The slide catches bulk material being poured into port 1218 and gently slides the material, such as seed, into hopper 1216 and receptacle 1220, thereby preventing the material from physical damage. Product slide 1282 may be made out of standard conveyor or other materials and is attached to container by appropriate means known to those skilled in the art. In the embodiment shown in FIG. 12, product slide 1282 is attached to receptacle 1220 by chain and link 1284, 1286. Product slide 1282 and chains 1284, 1286 can be removable from receptacle 1220. For example, product slide 1282 and chains 1284, 1286 can be removed depending on the product to be stored in receptacle 1220.

FIGS. 13A, 13B, 14A, and 14B illustrates a slide gate 1340, 1440, respectively, with a downwardly sloped leading edge 1370, 1470 which may pass between top member 1376-A, 1476-A and bottom member 1376-B, 1476-B of the frame 1376, 1476 to form a hopper door 1341. Slide gate 1340, 1440 is used to close or seal a dispensing opening 1482 of a hopper structure such as a hopper 1416 having hopper walls 1417 (see FIGS. 14A and 14B). As used herein, the term "hopper" can include stationary hoppers that can be at specific locations and can also include portable hoppers such as hoppers used in railcars or with semi-trucks and belt trailers and the like. Hopper walls 1417 form, or define, a product storage receptacle. As described above, various products (e.g. seeds, dry distillers grains, flour, plastic pellets, gravel, etc.) stored in gravity discharge hoppers like hopper 1416 (see FIGS. 14A and 14B) tend to "bridge" and/or not freely flow out of hopper 1416 in which the products reside. This bridging is caused by compaction of the gravity fed products. As hopper walls 1417 narrow toward dispensing opening 1482 of hopper 1416 coverable by slide gate 1340, 1440, the weight of the product, such as seeds, grains, flour, plastic pellets, or the like, causes the product to compact at the narrower regions forming a crust. Gate 1340, 1440 with gate mounted fingers 1374, 1474 of various designs can break the compacted crust to allow stored product to freely flow out of hopper 1416 upon opening gate 1340, 1440. In some instances, however, the stored product bridge can occur or reoccur above the reach of gate mounted fingers 1374, 1474. Thus, the stored product in such instances would remain bridged and not flow out.

As shown in FIGS. 13A, 13B, 14A, and 14B, in addition to the fingers 1374, 1474 on the gate 1340, 1440, a fluid F (represented by arrows, best seen in FIGS. 14A and 14B) can be blasted into hopper 1416 from ports 1390, 1490A within the gate fingers 1374, 1474. In some embodiments, a fluid F (represented by arrows, best seen in FIGS. 14A & 14B) can be additionally or alternatively blasted into the hopper 1416 from ports 1490B, 1490C in hopper walls 1417 and/or from ports 1490D in hopper gate 1340, 1440 to break the product bridge. As used herein, the term "fluid" means a flowable substance that can be injected or blasted into a hopper through ports. Fluids can include but are not limited to gases and/or liquids. Fluids as gases can include but are not limited to pure gases and gaseous mixtures, such as air and air infused with particulates, particles, or some other solids. Fluids as liquids can include but are not limited to liquids, such as water or the like, liquid mixtures such as water infused with particulates, particles, or some other solids, water with wet distillers grain, high moisture content wet distillers grains, milk, mash, or the like, and highly viscous liquids or liquid mixtures that can have solid-like qualities but still be flowable enough to be injected through ports into a hopper. For example, wet distillers grains can vary widely in moisture content (30-80%). It can be hauled in hopper bottom rail or semi-trailers or often on live belt trailers. In some situations, the material can segregate during hauling and not flow out of bottom hopper gates. The substance can be gummy where extra water could be beneficial or the wet distillers grain may have enough moisture in it to inject directly without adding water. These are situations where the ports can be used to dislodge hoppers containing wet distillers grains or similar products. Wet distillers grains have such a wide viscosity that they can possibly be considered solids at one stage and liquid when containing more water, or perhaps at a higher temperature where distiller solubles flow more easily. The fluid used in such situations can include air, water, or wet distillers grain. The wet distillers grain, if used as the fluid to be injected, for example, can come from within the hopper itself.

In some embodiments, one or more ports 1490E can be provided by a nozzle 1499 within hopper 1416 to provide a blast of fluid F into hopper 1416. For example, one or more ports 1490E can be flexible which permit random movement of the port 1490E when fluid F is injected therethrough. Such random movement of the port 1490E creates a random dispersion of fluid F to disrupt any bridged product. For example one or more ports 1490E can be attached to and/or be suspended from items such as chains 1284, 1286, product slide 1282 (see FIG. 12), or other items within hopper 1416. As above, pressure from port 1490E can cause random movement to disrupt bridged product by port 1490E being mounted on chains 1284, 1286 or product slide 1282. Thus, one or more ports 1490E can be suspended within hopper 1416 between hopper walls 1417 to provide a blast of fluid F into hopper 1416. Additionally, port 1490E can be suspended from the top wall of hopper 1416 or from walls 1417 of hopper 1416. For example, an extension arm can extend from the wall and hold a portion of port 1490E in a suspend position within hopper 1416. Like the product slide 1282 and chains 1284, 1286, in some embodiments, port 1490E can be removable from hopper 1416. Thereby, port 1490E can be removed depending on the product to be stored in hopper 1416.

Fluid F can be any suitable fluid that can provide a force to impact and fragment a product bridge, curst or funnel compaction. For example, the fluid F can be air or some other gas or gaseous mixture or water or some other liquid. The fluid to be injected in some instances can come from within the hopper (such as wet distillers grain). The fluid flow can be controlled by fluid supply system 1491 that supplies the pressurized fluids F through fluid lines 1495, 1496, 1497 to the ports 1390, 1490A, 1490B, 1490C, 1490D, 1490E. Fluid supply system 1491 can include a fluid supply, a pumping mechanism, and fluid lines to supply the fluid to the ports. For example, fluid supply system 1491 can include an air compressor to supply air through fluid lines 1495, 1496, 1497 to ports 1390 and 1490A-1490E.

Fluid supply system 1491 can be controlled by a controller such as a processing device, for example, PLC 128 or a separate processing device included in the fluid supply system 1491 that is in communication with PLC 128. Alternatively, fluid supply system 1491 can be controlled manually. For example, when a user, such as a purchaser of the product in hopper 1416, engages the controller, such as PLC 128 to retrieve the product, PLC 128 or a processing device in communication with PLC 128 can use one or more sensors to determine when fluid F should be injected into hopper 1416 and can determine at what location(s) fluid F should be injected. The sensor or sensors can be a flow sensor that can measure and determine the rate of flow of the product. If the flow rate falls below a predetermined or specified level, then the PLC 128 or some other associated processing device can be notified by the sensor and fluid F can be injected in hopper 1416 as needed and/or where needed. The predetermined or specified level that can serve as a threshold for injecting fluid F can be set by, for example, the manufacturer of the hopper system, the product supplier, or the user. Such predetermined or specified level can be determined through testing and can be different for different types of product and differently shaped hoppers 1416. Alternatively, the user can manually initiate through the controller, such as PLC 128 or some other processing device, the injection of fluid F based on the user's sense of a slowing or stopped flow rate of product from hopper 1416.

Solid material can be fed into fluid F to create a flow of solid material coming out of the ports to provide a great impact against any crust, bridge or compaction of the stored material. For example, injection material can be fed into the flow of fluid F by an injection material hopper 1498 (shown in dotted lines) through fluid line 1497. While shown in conjunction with a port 1490C in a side wall 1416, the system can be arranged to inject solid material into fluid flowing through any of ports 1390 and 1490A-1490E. Further, the solid material to be blasted through ports 1390 and 1490A-1490E can be the same material held within hopper 1416 and can be pulled from the hopper 1416 and fed into the fluid stream. For example, dry distillers grain from hopper 1416 can be fed into the flow of fluid F by an injection material hopper 1498 which accumulates dry distillers grain through a collection or suction device (not shown). The injection of solid material can include providing a single blast of fluid F for each individual piece of solid material to individually propel each piece of solid material into hopper 1416. The blasts of fluid F can be just enough to propel each individual piece of solid material causing the pieces of solid material to operate as projectiles. Alternatively, as described below, other solid material can be used in conjunction with injected fluid F.

Ports 1390, 1490A, 1490B, 1490C, 1490D, 1490E can be formed for example by nozzles, such as nozzles 1492, 1493, 1494, 1499, movable tubes, or by passages formed in fingers 1374. For example, gate mounted fingers 1374 can be designed with passages drilled from the bottom of gate 1340 through fingers 1374, with fluid lines (not shown) attached to the lower portion of gate 1340 and connected to the lower ends of the passages of ports 1390 that pass through the tops of fingers 1374. For embodiments with a passage drilled through fingers 1374, a nozzle can be fitted on one or more ports 1390 to direct the fluid flow therethrough. For example, a nozzle can be used in conjunction with the passage to direct the fluid flow in a specific angle or direction or can disperse the fluid flow in more than one direction. Such a nozzle can be also variably in its positioning.

When slide gate 1340, 1440 is being opened, forward pointing fingers 1374, 1474 break through the crust, bridge or funnel compaction releasing the product for mass flow from the proximate interior wall 1417. When pressurized, fluid F can be blasted or forced through the ports 1390A, 1490A in the fingers 1374, 1474 to further break through the crust, bridge or funnel compaction. Pressurized blasted fluid F forced into hopper 1416 to break the bridge, crust or funnel compaction through ports 1390, 1490A in fingers 1374, 1474 can reach far beyond fingers 1374 (typically mechanical in operation), 1474 depending on the pressure, port or nozzle size, volume, type of fluid, length of injection time, and/or material injected. Similarly, fluid ports 1490B, 1490C, 1490D, 1490E (nozzles 1493, 1494, 1499) can be mounted any place on gate 1440 or hopper 1416, hopper gate frame 1476, or suspended in the hopper 1416 to dislodge bridge or compacted material. These extra fluid ports can be included because the bridging can reoccur after hopper gate 1440 opening and above the reach of the gate fingers 1374, 1474 or fluid (alone or with other material) injected from the ports 1390, 1490A. Fluid ports 1490B, 1490C, 1490D, 1490E (nozzles 1493, 1494, 1499) can be stationary or rotated injection ports.

Figure 14A:
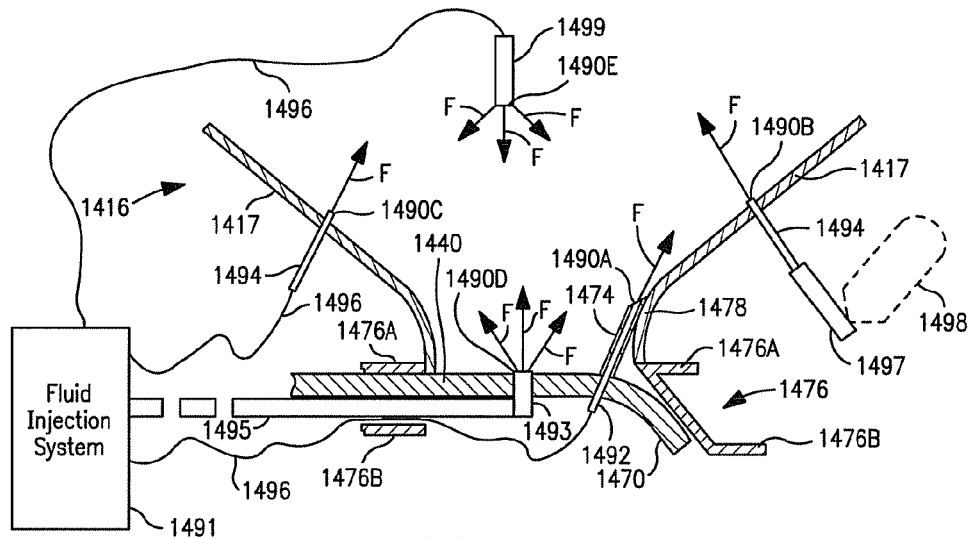
FIGS. 14A and 14B illustrate schematic side cross-sectional views of a different embodiment of a hopper slide gate as if taken along cut-lines 14A-14A and 14B-14B in FIGS. 13A and 13B showing another embodiment of fluid ports according to the present disclosure.

FIG. 14A shows the side view for slide gate 1440, in a closed position, in operable combination with hopper 1416. As hopper slide gate 1440 closes, vertical fingers 1474 closely approach or touch the hopper walls 1417. Hopper door frame 1476 (illustrated as "frame" 1376 from an above perspective view in FIGS. 13A and 13B) is bolted or otherwise secured to hopper 1416. When slide gate 1440 is fully in its closed position, downwardly sloping leading edge 1470 can mate flush with discharge periphery 1478 of the hopper 1416 and the hopper door frame 1476, 1376. Hopper 1416 can be secured to hopper frame 1476 such that leading edge 1470 of slide gate 1440 can pass between a top member 1476-A and a bottom member 1476-B of hopper door frame 1476. Fingers

1474 on the downward sloping leading edge 1470 of slide gate 1440 can mate flush with an inner wall of hopper 1416 when slide gate 1440 is in the closed position.

Figure 14B:
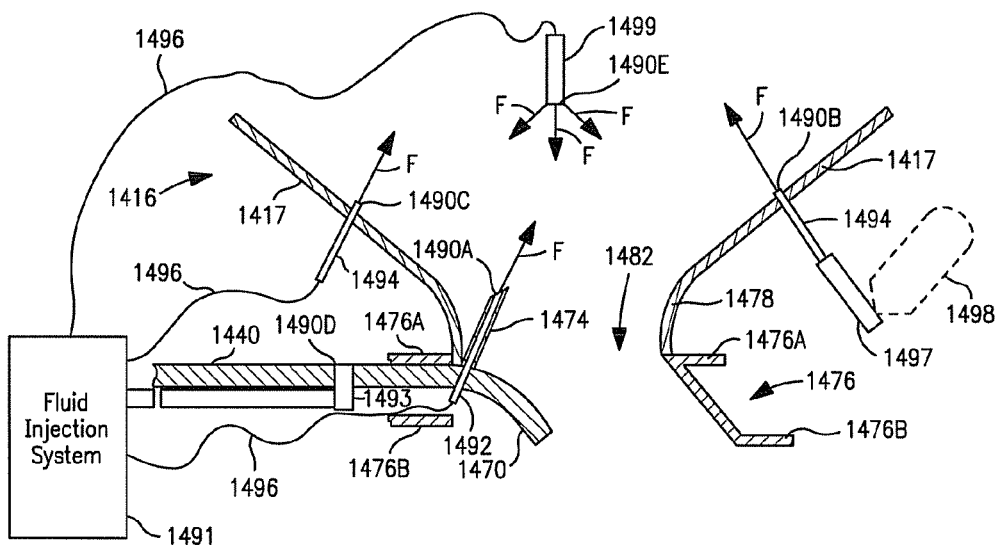

Upon opening slide gate 1440 to release the product, fingers 1474 can break up any bridge, crust, or funnel compaction within the pathway of fingers 1474. Further, fluid F can be injected into hopper 1416 through ports 1490A in fingers 1474. As shown in FIG. 14A, ports 1490A can be formed by nozzles 1492 that are supplied fluid through fluid lines 1496 and fluid supply system 1491. Nozzles 1492 can be used to direct the fluid flow in a specific angle or direction as shown in FIGS. 14A and 14B or can disperse the fluid flow in more than one direction. Such nozzles can be also variably in their positioning. Blasts of fluid F through ports 1490A provide slide gate 1440 with the ability break up bridge, crust, or funnel compaction beyond the reach of fingers 1474. In some embodiments, ports 1490A in fingers 1474 can be the only places where fluid is injected into the hopper 1416.

In other embodiments, hopper 1416 can include other ports through which fluids can be introduced, such as ports 1490B, 1490C, 1490D and 1490E. Each port can be formed by a nozzle. For example, ports 1490B, 1490C can be formed by nozzles 1494 that are positioned within the walls 1417 of the hopper 1416. The number, position and the type of the nozzles 1494 within walls 1417 can vary depending on the size and type of hopper 1416, the type of product to be placed in the hopper 1416, the type of material being stored, and/or other variables. Port 1490D in slide gate 1440 can be formed by nozzle 1493. The type of nozzle and the pattern of fluid spray or flow it creates can be determined as needed or desired and can be selected to best provide the ability to break up any bridge, crust, or funnel compaction of the product in hopper 1416. Nozzles 1493 and 1494 can be connected to fluid supply system 1491 by lines 1496 and 1497 (the connection of line 1497 to fluid supply system 1491 is not shown). As discussed above, a nozzle 1499 can be suspended with hopper 1416 between walls 1417 to further help fragment any bridge, crust, or funnel compaction of the product in hopper 1416 that might occur or reoccur. The type of nozzle used as nozzle 1499 and the pattern of fluid flow it creates can be selected to best provide the ability to break up any bridge, crust, or funnel compaction of the product in hopper 1416.

FIG. 14B shows in further detail the side view for slide gate 1440, in an open position, in operable combination with hopper 1416. As hopper slide gate 1440 opens, vertical fingers 1474 move away from the hopper frame, e.g., interior walls 1417 of hopper 1416. When slide gate 1440 is fully in its open position, downwardly sloping leading edge 1470 can mate flush with opposing side of hopper door frame 1476. The opposing sides of hopper interior walls 1417 again are secured to hopper frame 1476. Fingers 1474 on downward sloping leading edge 1470 of slide gate 1440 will remain projecting into the hopper discharge opening. As shown in FIG. 14B, fluid supply system 1491 can terminate the supply of fluid to certain nozzles, such as nozzle 1493, as needed when those nozzles might no longer contribute to the breaking up of the product to induce or improve flow through the hopper 1416. Nozzles 1492, 1494, 1499 can continue to be supplied with fluid as needed to continue the flow of product through the hopper 1416.

Depending on the product stored in hopper 116 and receptacle 120 (FIG. 1) and the type of flow problems, fingers 1374 and 1474, respectively, can vary in length, diameter, number and shape. Likewise, the type of fluid F and whether the fluid is used in conjunction with solid materials such as the hopper stored solids can vary based on the product stored and the type of flow problems expected. These variables including the type of fluid F, the use of the solid materials and the number, size and shape of the fingers can affect the type of ports used. The ports (such as nozzles) can be of any length, diameter, number and shape and can be mounted any place on the walls 1417, gates 1440, or even suspended in the hopper to break through the crust, bridge or funnel compaction releasing the product for mass flow from the proximate interior walls 1417.

As an example, dry distillers grains (DDG) habitually get compacted during transport in rail hopper cars and will not freely flow out when the hopper gate 1440 is opened. When product settles or more fully dries, especially bounced and compacted during transport, mechanical gate fingers 1374, 1474 in some instances cannot reach far enough into the storage hopper 1416 to break the compaction or product bridge. Air injected through ports 1490A in the gate fingers 1474 or hopper mounted nozzles 1493, 1494 in a fixed position may create caverns in the stored material. Consequently, in such an instance, it can be beneficial to mount more injection ports, or install nozzles that can be manually or mechanically rotated to cover more area. Since air can have limited impact variance, a suction tube can be mounted to collect dry distillers grains from the hopper 1416 or elsewhere and blast these collected grains particles through the ports 1490A, 1490B, 1490C, 1490D to aggressively disrupt the crust, bridge, or funnel compaction.

To summarize, gate fingers 1374, 1474 can be set at any angle and length to break up bridge materials. However, with some bulk product, compaction and bridging of the material can occur above the length of gate fingers 1374, 1474 that would not allow all the material to gravity discharge. Injection port(s) 1490A-1490E can be nozzles that are stationary or that can rotate to direct air or injection material at different angles. Each hopper 1416 can contain one port or multiple injection ports. The injection ports can be drilled holes for air passage through the gate fingers, movable tubes, or nozzles inside or outside of the hopper 1416. Injection port size can vary depending on the fluid injected, such as air or water, or if solid material is also injected. If a nozzle is used, the type of nozzle can be chosen based on fluid flow pattern, force of blast created, type of material stored, and/or other variables.

Injection pressure can vary depending on the material stored in the hopper 1416. For example, the pounds of air pressure per square inch (psi) if air is used as the fluid can range from about 20 psi to over 1,000 psi. If air is used as the fluid, for instance, flour as the product stored in the hopper might need only about 20 psi to limit escaping dust from the hopper 1416. However, stored soybeans or plastic pellets, for example, can require about 50 psi to about 100 psi, whereas gravel containing hoppers can be injected with 1000 psi or more to dislodge the stored material.

The injection frequency for injecting fluid can also vary. For example, the injection frequency can be short blasts, for instance, about 1/10 of a second or shorter. Alternatively, the injection frequency can be about a minute or longer, or the injection can be continuous during discharge. The injection frequency can depend on, for example, the size and shape of the hopper, the fluid used, the material stored, and/or continued propensity of the product material to bridge. The injection can be operated manually or automatically, for example, as described above, based on the view from hopper gauges or flow (or lack of flow) from the hopper. The frequency of the injections can depend on whether it is manually or automatically operated. Thus, the frequency of injection can be asynchronous or synchronous.

The fluid supply system can be mounted on the hopper. For example, the fluid supply system can be a permanent supply of air, or, for portable hoppers, a portable pressurized air tank can be connected to the "air system line" or "air injection port." As above, the fluid supply system can be operated manually or automatically based on the view from hopper site gauges or flow (or lack of flow) from the hopper. Although air is likely to not contaminate stored product, injection fluids can include other gases, gaseous mixtures, water, and other liquids. Further, as stated above, sand or other solid materials can be injected with the fluid being used depending on the material stored and discharge requirements. For example, bridged plastic pellets stored in the hopper may be injected by force to dislodge bridged pellets of the same material. Likewise, dry distillers grains can be air injected into storage hoppers containing the same material. Using solid materials from an "air injection hopper" in an injection flow can act to provide impact points to chip away at the bridged material. For example, solid dry distillers grain material injected against solid dry distillers grain bridged material might dislodge easier than simply air against the firm bridged material.

FIG. 1 shows locker 126 (see also locker 226 in FIG. 2), wherein packaged products (e.g., bags containing seed, chemical, fertilizer, etc.) ordered from an inventory provider are stored for pick up according to the method of the disclosure.

FIG. 1 also shows one embodiment of the hopper apparatus 110 having rows of paired receptacles. Any number of receptacles of different shapes and sizes and in numerous physical arrangements are within the scope of this disclosure.

In general, the method of the disclosure provides a unique system for end-users to order products from an inventory provider and self-service pick up of those products at a site remote from the inventory provider at any time of the day and week. In practice, an end-user calls an inventory provider with an order. The end-user is provided with an end-user access code. An end-user broadly means any person that orders product(s) from an inventory provider. The inventory provider can communicate with PLC 128 of hopper apparatus 110 (FIG. 1) of the disclosure. Communication is facilitated by any communication means now or hereafter known. For example, communication devices and systems can include land or mobile telephones and systems, computers, and/or the internet. The inventory provider calls PLC 128 to check the vacant container capacity of hopper apparatus 110. PLC 128 determines the status of its various storage container units (i.e., receptacles 120, lockers 126, and pallet lockers 132) and provides that information to the inventory provider. Collection, storage, and communication of data can be accomplished in numerous ways known by those persons skilled in the art. For example, in one embodiment of the disclosure, PLC 128 and inventory provider may link with a website containing data relating to hopper apparatus 110, end-user, and product information. The inventory provider can then reserve various hopper apparatus 110 storage container units for subsequent delivery of product ordered by an end-user. It is understood that more than one inventory provider may have use of and access to the hopper apparatus and method of the disclosure.

The inventory provider then arranges for the product ordered by the end-user to be delivered via delivery truck or other vehicle to the hopper apparatus 110. The hopper apparatus 110 is typically located at a remote site, closer to the activity of the product end-users. However, it is within the scope of the disclosure that it can be located at the inventory provider site, such that end-users can obtain product at that site outside of business hours.

Upon arrival at the hopper apparatus, a person with knowledge of the end-user code will typically interact with PLC 128 by entering the previously assigned end-user codes, which will cause the receptacles 120, lockers 126, and pallet lockers 132 that were previously reserved by the inventory provider for the particular end-user order to open for insertion of the bulk products and product packages. By requiring the inventory provider to enter the end-user code, a cross-check is integrated into the method of the disclosure, whereby the cross-check insures that correct products get into the correct compartments, which insures that the end-users obtain the correct products when they enter in their end-user code.

For delivery of bulk seed to receptacle 120, the person opens ports 118 and inputs the product into receptacle 120. It is contemplated that the hopper apparatus of the disclosure also can be located adjacent a large fixed seed storage bin, such as a TruBulk® bulk delivery system (Syngenta Seeds, Inc.). Transfer of seed ordered by an end-user to hopper apparatus 110 can be implemented by a seed delivery conduit removably interconnecting the TruBulk® bulk delivery system and fill access port 118 of hopper apparatus 110.

For insertion of a large container 122 into receptacle 120, door 736 (FIG. 7) is opened. Typically, a forklift is needed to insert large container 122 into receptacle 120. The end-user access code corresponding to the particular receptacle 120, lockers 126, and pallet lockers 132 that contains the end-user product is entered into PLC 128. The entry of the end-user code can be input into PLC 128 at any time after the inventory provider receives the order. The inventory provider must engage the bottom exit door 523 (FIG. 5) with clamp 527 by manually unlocking safety latch 124 (FIG. 1) and hooking clamp 527 to bottom exit door 423.

To determine if the product(s) that the end-user has ordered is stored in the hopper apparatus, the end-user communicates with PLC 128 via internet, phones, the web, or other means and enters his or her access code. Upon receiving the access code, PLC 128 will indicate to the user whether delivery has occurred. According to the disclosure, the end-user can determine product delivery status any day and time. Furthermore, the end-user can take delivery of the product contained from hopper apparatus 110 any day and time. The hopper apparatus 110 of the disclosure is self-service for the end-user and automatic, not needing anyone representing the inventory provider to be present during transfer of the products to the end-user.

Upon arriving at the hopper apparatus 110, the end-user enters his or her access code into PLC 128. The PLC will communicate to end-user where the products are stored within the hopper apparatus 110. For example:

TABLE 1

| | |
|---|---|
| Bulk hybrid seed 5432 (90 units) | Compartment A |
| Bulk hybrid seed 7654 (120 units) | Compartment B |
| Hybrid seed 3210 (50 bags) | Compartment C |
| Hybrid Seed 4321 (5 Bags) | Compartment D |
| Chemical 8921 (3 bags) | Compartment E |

Referring to Table 1, the end-user selects one product for delivery, for example bulk hybrid seed 5432, wherein the PLC 128 will ask if truck box, seed wagon, seed tender unit, or other receiving container is in its proper place under the output end of conveyor 112. When the end-user indicates that the truck is in place, PLC 128 will indicate to the appropriate actuator(s) to open the respective sliding doors, wherein the 90 units of hybrid seed 5432 within Compartment A is conveyed to the waiting container.

However, prior to delivery, the grower may be required to accept all legal disclaimers for the particular product as indicated by PLC 128. Furthermore, it is within the scope of the present disclosure to require that end-user agree to contract terms. For example, in the agriculture industry, PLC 128 would provide contract language that the end-user must accept, requiring the end-user to abide by certain Integrated Resistance Management practices.

Again referring to Table 1, the end-user repeats the process for the hybrid seed 7654, also stored in bulk within hopper apparatus 110. As already described above, bulk product is stored freely within receptacle 120 or within large container 122 residing in receptacle 120. As is evident from FIG. 1, the storage capacity of produce stored freely within receptacle 120 is larger than the storage capacity of large container 122 residing within receptacle 120.

PLC 128 includes a screen and input device such as a key pad (not shown) for display and input of information. It is also within the scope of the disclosure to allow end-user access to the hopper apparatus 110 by using a credit card or other card that identifies the end-user. Once the end-user has agreed to the terms of the purchase, the end-user indicates to PLC 128 that the truck is in place, and ownership of the product immediately passes from the inventory provider to the end-user.

By way of example, if the product selected is contained in container 122 or directly in receptacle 120, the PLC 128 causes the conveyor to start and the actuator(s) to open the respective slide doors 423 (FIG. 4) and/or 940 (FIGS. 9A and 9B). PLC 128 runs the conveyors until a flow sensor (not shown) tells PLC 128 that receptacle 120 is empty. In embodiments that employ systems as illustrated in FIGS. 13A-14B, once flow begins to slow or stop as indicated by the flow sensor, fluid supply system 1491 under the control of a controller, such as PLC 128 or some other processing device, can inject fluid F through fluid port(s) 1490A-1490E into the receptacle to confirm that no product is left in the receptacle. Alternatively, the user can initiate the injection of fluid F through fluid supply system 1491 and fluid port(s) 1490A-1490E into the receptacle to confirm that no product is left therein. Once the sensors indicate that the receptacle 120 is clear of the product, the PLC 128 can send a signal causing the respective slide doors 423 and/or 940 to close. The conveyor belts 112 and 114 are run, however, an extra time to ensure complete exit of the product, after which they are stopped.

As product enters conveyor belt 112, application of another product (e.g., inoculants, fertilizer, pesticides, emulsifiers, coatings, treatments, etc.) can be applied to the product before exiting into the end-users receptacle.

To continue transferring end-user products identified in Table 1, the end-user selects hybrid seed 3210 (50 bags). The 50 bags contained in Compartment C would likely be stored in a pallet locker 132 (FIG. 1). PLC 128 will ask if the end-user is ready to take delivery of the pallet. When the end-user indicates that he or she is ready to take delivery, PLC 128 will instruct the appropriate actuator to unlock the appropriate pallet locker 132 door, wherein the end-user removes the pallet, typically by a forklift, for loading of a truck box or other receiving container. End-user continues transferring the products contained in Compartments D and E. The packaged products contained in Compartments D and E would be stored in package lockers 126 (FIG. 1). To unload package Hybrid Seed 4321 and Chemical 8921 from package lockers 126, end-user simply repeats the steps used to transfer the products contained in Compartment C.

End-user still needs to take delivery of the remaining articles. For delivery of bulk articles contained freely within receptacle 120 or in container 122, end-user follows the method already describe above. For packaged items that are stored in a locker 126, end-user again enters in his or her access code, which may be a different access code for each compartment accessed by the end-user, accepts all legal disclaimers, contract terms, etc. Referring to the example products listed in Table 1, the end-user selects Hybrid Seed 4321 Bags indicator on PLC 128. Once the end-user selects the product, ownership passes from the inventory provider to the end-user. PLC 128 then causes the locker door to unlock. The end-user removes the packages from the locker and loads them into a vehicle.

Once the end-user removes the products he or she previously ordered, the end-user indicates to PLC 128 that the transaction is complete. The PLC 128 will cause a receipt to be printed out. The end-user can also request additional information to be printed out, for example, product specifications, relevant federal and state regulations, and instructions. As is understood in the art, any type of information can be input and stored in PLC 128 and printed out for the benefit of the end-user. It is recognized that PLC 128 can function as an information center, wherein local news, industry events, special sales, weather, etc., are provided to the end-user. For example, PLC 128 may provide the end-user with current grain commodity prices.

It is customary for end-users to produce products (e.g., grain) from the original product (e.g., seed) dispensed from the disclosure apparatus. This disclosure can be used to reverse the transaction, wherein the end-user is given an access code to load product (e.g., grain) into container 122 or in receptacle 120. The originating inventory provider (dealer), or designee, can receive products from the end-user by being dispensed by belt conveyor 112.

The foregoing disclosure has been described in detail by way of illustration and example for purposes of clarity and understanding. However, it will be obvious that certain changes and modifications may be practiced within the scope of the disclosure.

What is claimed is:

1. A method of supplying material through a hopper, the method comprising:
   providing a hopper that comprises hopper walls that form a product storage receptacle and a hopper door, the hopper door including a frame, a slide gate disposed within the frame and retractable between an open position and a closed position, and a set of fingers projecting from the slide gate, the hopper door further having a port through at least one of the fingers of the set of fingers;
   opening the slide gate of the hopper door such that the fingers dislodge material within the hopper proximate to the hopper door;
   injecting fluid through the port in the at least one finger into the hopper to dislodge material within the hopper above the fingers; and
   injecting solid material with the fluid through the port to facilitate the dislodging of the material within the hopper.

2. The method of claim 1, wherein the set of fingers project upward above the frame.

3. The method of claim 2, wherein the set of fingers reside adjacent a side wall of the hopper structure when the slide gate is in the closed position.

4. The method of claim 1, wherein the port is connected to a fluid supply system by a fluid line to supply fluid into the hopper structure.

5. The method of claim 1, further comprising a controller for controlling the injection of fluid into the hopper, the controller permitting the injection of fluid to be at least one of automatically controlled or manually controlled.

* * * * *